(12) United States Patent
Hendrix et al.

(10) Patent No.: US 8,094,270 B2
(45) Date of Patent: Jan. 10, 2012

(54) THIN-FILM OPTICAL RETARDERS

(75) Inventors: Karen D. Hendrix, Santa Rosa, CA (US); Kim L. Tan, Santa Rosa, CA (US); Charles A. Hulse, Sebastopol, CA (US); Robert B. Sargent, Santa Rosa, CA (US); Robert E. Klinger, Winchester, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1486 days.

(21) Appl. No.: 11/564,500

(22) Filed: Nov. 29, 2006

(65) Prior Publication Data

US 2007/0195272 A1     Aug. 23, 2007

Related U.S. Application Data

(60) Provisional application No. 60/742,940, filed on Dec. 6, 2005.

(51) Int. Cl.
*G02F 1/1335* (2006.01)
*G02F 1/13* (2006.01)

(52) U.S. Cl. ........................ 349/117; 349/187

(58) Field of Classification Search .................. 349/117
See application file for complete search history.

(56) References Cited

U.S. PATENT DOCUMENTS

| | | | |
|---|---|---|---|
| 5,285,303 A | 2/1994 | Okada et al. | 349/117 |
| 5,612,801 A * | 3/1997 | Winker | 349/119 |
| 5,638,197 A | 6/1997 | Gunning, III et al. | 349/96 |
| 5,866,204 A | 2/1999 | Robbie et al. | 427/256 |
| 5,932,354 A * | 8/1999 | Takeda et al. | 428/426 |
| 6,097,460 A | 8/2000 | Shimizu et al. | 349/117 |
| 6,248,422 B1 | 6/2001 | Robbie et al. | 428/119 |
| 6,475,557 B1 | 11/2002 | Mori et al. | 427/162 |
| 6,590,707 B1 | 7/2003 | Weber | 359/498 |
| 6,770,353 B1 | 8/2004 | Mardilovich et al. | 428/209 |
| 7,079,209 B2 | 7/2006 | Nakagawa | 349/119 |
| 7,170,574 B2 | 1/2007 | Tan et al. | 349/117 |
| 7,199,928 B2 * | 4/2007 | Uehara | 359/586 |
| 2004/0095535 A1* | 5/2004 | Nakagawa | 349/117 |
| 2005/0128391 A1* | 6/2005 | Tan et al. | 349/117 |

(Continued)

FOREIGN PATENT DOCUMENTS

EP    1542044    6/2005

OTHER PUBLICATIONS

Motohiro et al., "Thin film retardation plate by oblique deposition", Applied Optics, vol. 28, No. 13, Jul. 1, 1989, pp. 2466-2482.*

(Continued)

*Primary Examiner* — Mark Robinson
*Assistant Examiner* — Charles Chang
(74) *Attorney, Agent, or Firm* — Matthew A. Pequignot; Pequignot + Myers LLC

(57) ABSTRACT

An oblique angle deposition is used to provide an A-plate optical retarder having at least one dense, form-birefringent layer. According to one embodiment, the dense, form-birefringent layer(s) are deposited as part of an FBAR stack to provide an all-dielectric full-function A/–C-plate trim retarder for LCD birefringence compensation. Advantageously, the dense structure of the full-function A/–C-plate trim retarder offers high durability and/or stability, thus making it well suited for providing polarization compensation in high light flux polarization-based projection systems.

29 Claims, 11 Drawing Sheets

U.S. PATENT DOCUMENTS

2006/0127830 A1    6/2006    Deng et al. .................... 431/118

OTHER PUBLICATIONS

Hodgkinson et al, "Birefringent Thin Films and Polarizing Elements", World Scientific Publishing Company, Feb. 1, 1998, Chapter 7 pp. 117-134.

Hodgkinson et al, "Birefringent Thin Films and Polarizing Elements", World Scientific Publishing Company, Feb. 1, 1998, Chapter 16 pp. 289-322.

U.S. Appl. No. 11/591,623, filed Nov. 1, 2006, Tan et al.

Schadt et al, "Surface-Induced Parallel Alignment of Liquid Crystals by Linearly Polymerized Photopolymers", Jap. J. Appl. Phys., 31, pp. 2155-2164, 1992.

Schadt et al, "Photo-Generation of Linearly Polymerized Liquid Crystal Aligning Layers Comprising Novel, Integrated Optically Patterned Retarders and Color Filters", Jap. J. Appl. Phys., 34, pp. 3240-3249, 1995.

Nieuwenhuizen et al, Microfactography of Thin Films, Philips Tech. Rev. 27, (1966), p. 87.

Robbie et al, "Ultrahigh Vacuum Glancing Angle Deposition System for Thin Films with Controlled Three-Dimensional Nanoscale Structure", Review of Scientific Instruments, vol. 75, pp. 1089-1097 (2004).

Beydaghyan et al, "Enhanced Birefringence in Vacuum Evaporated Silicon Thin Films", Applied Optics, vol. 43, pp. 5343-5349 (2004).

Woo et al, "Optical Anisotropy of TiO2 and MgF2 Thin Films prepared by Glancing Angle Deposition", Journal of the Korean Physical Society, vol. 49, No. 5, Nov. 2006, pp. 2136-2142.

Woo et al, "Optical Anisotropy of Microstructure-Controlled TiO2 Films Fabricated by Glancing Angle Deposition", Journal of the Korean Physical Society, vol. 48, No. 6, Jun. 2006, pp. 1199-1204.

Schadt et al, "Photo-Induced Alignment and Patterning of Hybrid Liquid Crystalline Polymer Films on Single Substrates", Jpn. J. Appl. Phys. vol. 34, pp. 764-767, 1995.

"General Methodology for LcoS Panel Compensation", Chen et al, SID 04 Digest, pp. 990-993.

"Achromatic phase retarder by slanted illumincation of a dielectric grating with period comparable with the wavelength", Bokor et al, Applied Optics, vol. 40, No. 13, May 1, 2001; pp. 2076-2080.

"Mechanism of shape formation of three-dimensional periodic nanostructures by bias sputtering", Kawakami et al, Applied Physics Ltrs, vol. 74, No. 8, Jan. 18, 1999, pp. 463-465.

"Photonic crystals for the visible range fabricated by autocloning technique and their application", Sato et al, Optical and Quantum Electronics 34: pp. 63-70.

"Design and Characterization of a compensator for high contrast LcoS projection systems", Tan et al, SID 05 Digest, pp. 1-4.

Wang Jian-Guo et al, "Form Birefringence in Thin Films with Oblique Columnar Structures", Chinese Physics Ltrs, Inst. Of Physics Publishing, Bristol, GM vol. 22, No. 8, pp. 2066-2068.

U.S. Appl. No. 60/727,969, filed Oct. 18, 2005, Taylor et al.

http://www.physics.queensu.ca/~robbie/glad.html, Jun. 6, 2004.

* cited by examiner

THIN-FILM OPTICAL RETARDERS

CROSS-REFERENCE TO RELATED APPLICATIONS

This application claims priority from U.S. Provisional Application No. 60/742,940 filed Dec. 6, 2005, which is hereby incorporated by reference.

MICROFICHE APPENDIX

Not Applicable.

TECHNICAL FIELD

The present application relates generally to polarization control, and in particular, to thin-film optical retarders for providing birefringence in polarization-sensitive optical systems.

BACKGROUND OF THE INVENTION

Optical retarders are used to alter the relative phase of polarized light passing therethrough, and thus, are well suited for use in applications where control over the polarization is required. In addition to inducing ¼- and ½-wave retardations to control the polarization of light, optical retarders are also used to provide polarization compensation for other optical components in a system. For example, optical retarder compensators are used to introduce a phase delay in incident light to correct for phase differences between two components of polarized light introduced by other optical components in a system.

One particularly important application of optical retarders is providing polarization compensation for liquid crystal display (LCD) panels, wherein residual birefringence of the liquid crystal cell causes linearly polarized light to become slightly elliptical, and wherein the optical retarder maintains the linear polarization in concert with the birefringence of the liquid crystal cell. These compensators, which are often referred to as trim retarder compensators, have been shown to improve system contrast in numerous LCD systems.

For example, consider the 3-panel WGP-based LCoS microdisplay projection system illustrated in FIG. 1. The microdisplay system includes a light source 5, which for example is a high-pressure discharge lamp, and a light rod 7. The light rod 7 homogenizes the cone of light produced by the light source 5 to ensure a spatially uniform light distribution. Optionally, the light rod 7 is a polarization conversion light pipe (PCLP) for producing linearly polarized light. A first lens 8a passes the light from the light pipe 7 to a first folding mirror 9, which directs the light to a first dichroic filter 10. The dichroic filter 10 separates out the blue light from the remaining light, and directs the blue light via second 8b and third 8c lenses, and second 17 and third 16 folding mirrors to a first LCoS display panel 20a. The remaining light, which is transmitted through the dichroic filter 10, is directed via fourth and fifth lenses 8d and 8e and a fourth folding mirror 11 to a second dichroic filter 12. The second dichroic filter 12 separates the remaining light into green and red light, the former of which is directed to a second LCoS display panel 20b and the latter of which passes to a third LCoS display panel 20c. In this instance, each LCoS display panel 20a, 20b, 20c is a vertically aligned nematic (VAN)-mode microdisplay.

Prior to reaching each LCoS display panel 20a, 20b, and 20c, the incident light first passes through a WGP 15, 14, and 13 and a trim retarder compensator 21a, 21b, and 21c, respectively. Each WGP 15, 14, and 13 is a polarizer/analyser formed from a plurality of parallel micro-wires that transmits light having a polarization orthogonal to the direction of the parallel micro-wires and reflects light having a polarization parallel to the direction of the wires (e.g., if the polarizers are designed to pass horizontal or P-polarized light, as illustrated in FIG. 1, the micro-wires will be perpendicular to the plane of FIG. 1). Each LCoS panel 20a, 20b, and 20c alters the polarization of the linearly polarized incident light pixel-by-pixel and reflects the modulated light back to the corresponding WGP 15, 14, and 13. Since each WGP 15, 14, and 13 is orientated at approximately ±45° with respect to the principal direction of light propagation, in addition to serving as a polarizer/analyzer, each WGP 15, 13 and 14 also serves as a beamsplitter for separating the incoming light from the outgoing light by steering or deflecting the light reflected from the each LCoS panel along an output optical path orthogonal to the incoming optical path. More specifically, each WGP 15, 14, and 13 reflects S-polarized light (e.g., polarized light rotated by 90° by pixels in an ON state) to the X-cube 19. The X-cube 19 aggregates (i.e., converges) the image from each of the three color channels and, via the projection lens 18, projects the final image onto a large screen (not shown). Optionally, each color channel further includes a pre-polarizer (not shown) and/or a clean-up analyzer (not shown), which for example, may include one or more WGPs and/or dichroic sheet polarizers.

The trim retarder compensators 21a, 21b, and 21c (herein simply referred to as trim retarders), are compensating elements used to improve the contrast performance level of the microdisplay system, which is otherwise limited by the residual birefringence of the LCoS panels in the dark (e.g., off) state. In particular, each trim retarder 21a, 21b, and 21c introduces a phase retardance that cancels the retardance resulting from the inherent birefringence of the corresponding LCoS panel. The term 'retardance' or 'retardation', as used herein, refers to linear retardance magnitude as opposed to circular retardance magnitude, unless stated otherwise. Linear retardance is the difference between two orthogonal indices of refraction times the thickness of the optical element. Linear retardance causes a phase difference between two orthogonal linear polarizations, where one polarization is aligned parallel to the extra-ordinary axis of the linear retarder and the other polarization is aligned parallel to the ordinary axis of the linear retarder. In contrast, circular retardance causes a relative phase difference between right- and left-handed circular polarized light.

Linear retardance may be described as either in-plane or out-of-plane retardance. In-plane retardance, expressed as optical path length difference, refers to the difference between two orthogonal in-plane indices of refraction times the physical thickness of the optical element. Out-of-plane retardance refers to the difference of the index of refraction along the thickness direction (z direction) of the optical element and one in-plane index of refraction (or an average of in-plane indices of refraction), times the physical thickness of the optical element. Normal incidence rays in a cone bundle see only in-plane retardance, whereas off-axis rays including oblique rays (i.e. non-normal but along the principal S- and P-planes) and skew rays (i.e. non-normal and incident away from the principal S- and P-planes) experience both out-of-plane retardance and in-plane retardance. Notably, in-plane retardance is not observed for the trivial case of 90° ray angle in the birefringent medium.

In the absence of trim retarders 21a-c, the P-polarized polarized light that illuminates each microdisplay panel in the dark (off) state is slightly elliptically polarized upon reflection due to the residual birefringence of the LCoS panels 20a-c. When the elliptically polarized light, which contains both a P- and an S-component, is transmitted to the corresponding WGP 15, 14, 13, the S component is reflected to the X-cube thus allowing dark state light leakage onto the large screen and limiting the contrast of the projection system.

The use of trim retarders 21a-c improves the contrast level by providing in-plane retardance that compensates for the retardance resulting from the residual birefringence in the LCoS panels 20a-c. More specifically, the trim retarders 21a-c are oriented such that their slow axes are configured at orthogonal azimuthal alignment to the slow axes of the LCoS panels 20a-c (termed "crossed axes"), while their fast axes are configured at orthogonal azimuthal alignment to the fast axes of the LCoS panels 20a-c. The terms slow axis (SA) and fast axis (FA), as used herein, refer to the two orthogonal birefringent axes when the linear retardance is measured at normal incidence. Notably, the SA and FA locations change with off-axis illumination as well as reversing the SA/FA roles for a negative out-of-plane retardance component at a large angle of incidence.

Since the slow axes of the trim retarders 21a-c and LCoS panels 20a-c are configured at orthogonal azimuthal orientations, the role of the fast/slow axes switches from the trim retarder 21a-c to the LCoS panel 20a-c for normal incidence light. In other words, light having a specific polarization is alternately delayed more then less, or vice-versa, in the trim retarder 21a-c and the LCoS panel 20a-c, respectively. The net effect is zero relative delay for the incoming polarization, and as a result, an unchanged polarization (i.e., the output light is not elliptically polarized). The corresponding WGP 15, 14, 13 and/or optional clean-up polarizer then rejects the output light so that the dark-state panel light leakage does not appear on the screen. Since the trim retarders 21a-c do not alter significantly the throughput of the panel on-state, the resulting sequential contrast (full on/full off) is excellent.

The operating principle of each trim retarder 21a-c is further illustrated in FIG. 2, with reference to the core optics of a single-channel light engine. These core optics include a pre-polarizer 30, a WGP 31, a trim retarder 32, a VAN-mode LCoS panel 33, and a clean-up polarizer (not shown). In operation, unpolarized or partial polarized light output from a prior stage illumination (not shown) is passed through the pre-polarizer 30 to obtain P-polarized light. The light is transmitted through the WGP 31 and its polarization extinction ratio is enhanced. The trim retarder 32 preconditions the incoming P-polarization beam and creates an elliptical output. Ideally, the ellipticity in the polarized light incident onto the LCoS panel 33, which is in a dark (off) state, is undone by the residual panel retardance. The reflected light, after completing a double pass through the VAN-LCoS panel 33 and the trim retarder 32, thus remains P-polarized. The remaining P-polarization component transmitted by the WGP 31 is injected back into the illumination system and is eventually lost.

As discussed above, the trim retarder 32 ideally provides an in-plane retardance that matches the in-plane retardance of the corresponding LCoS panel 33 in the off-state. In practice, however, the in-plane retardance of both the LCoS panel 33 and the trim retarder 32 tends to vary within each component due to manufacturing tolerances in device thickness and material birefringence control, as well as operational drifts (temperature, mechanical stress etc). As a result, to ensure adequate compensation it is common to provide a higher in-plane retardance in the trim retarder 32 than that exhibited by the LCoS panel 33. For example, a trim retarder with an in-plane retardance of 10 nm (at $\lambda$=550 nm) is often provided to compensate for a VAN-mode LCoS exhibiting a 2 nm in-plane retardance (at $\lambda$=550 nm). As is known to those of skill in the art, this mismatch in in-plane value typically requires offsetting of the optic axis of the trim retarder 32, relative to the nominal crossed optic axes configuration described above. In other words, the trim retarder is clocked-in by rotating its azimuth orientation away from the crossed-axes configuration.

In addition to providing in-plane retardance, it is common for the trim retarder 32 to also provide out-of-plane retardance to increase the field of view. More specifically, it is common for trim retarders to include both an A-plate compensation component for compensating the in-plane retardance and a –C-plate compensation component, which exhibits negative birefringence, for compensating for out-of plane retardance. These full function A/–C-plate trim retarders optionally also include an O-plate component. An A-plate is a birefringent optical element having its extraordinary axis oriented parallel to the plane of the plate. A C-plate is birefringent optical element having its extraordinary axis oriented perpendicular to the plane of the plate (i.e. parallel to the direction of normally incident light). An O-plate is a birefringent optical element having its extraordinary axis (i.e., its optic axis or c-axis) oriented at an oblique angle with respect to the plane of the plate.

Conventionally, trim retarders have been fabricated out of stretched polymers laminated on anti-reflection (AR) coated glass substrates. More specifically, biaxially stretched polymer films, which provide a higher index of refraction along the direction of force (e.g., in the XY-plane) than along the unstretched z-direction, are used to provide full-function A/–C-plate trim retarders (i.e., in general a negative biaxial foil results). Unfortunately, stretched polymer films are not ideal for many polarization-based projection systems due to a lack of retardance uniformity and environmental reliability issues. For example, with regard to the latter, the high temperature and high light flux environment provided in many microdisplay projection applications tends to make the stretched polymers relax over time, and thus lose birefringence.

To obviate the uniformity and reliability issues, U.S. Pat. Appl. No. 20050128391, which is hereby incorporated by reference, teaches an A-plate trim retarder fabricated by spin-coating liquid crystal polymer (LCP) and linear photo-polymerization (LPP) layers on a transparent substrate. The directors of the LC monomers are aligned by the LPP layer and then cross-linked into a polymer host for solid film-like rigidity and reliability. The lack of a suitable –C-plate element is obviated with the introduction of a dielectric thin film form-birefringent (FB) stack into the AR coating designs (FBAR). While this full-function A/–C-plate retarder, has been shown to enhance the image contrast of VAN-mode LCoS display system from several hundreds to one to several thousands to one, it is desirable to reduce the use of organic layers in high light flux projectors applications.

In fact, the presence of any organic material, including lamination epoxy, is generally a source of reliability concerns. One approach to preparing an all-inorganic trim retarder is to use birefringent crystals. While birefringent crystals are more durable and/or more stable, the cost of growing and polishing the crystal plate may be significant, especially for microdisplays having a diagonal of about one inch or greater. As a result, there has been increasing interest in trim retarders fabricated from inorganic and/or dielectric thin films. For example, in U.S. Prov. Appl. No. 11/591,623 filed Nov. 1, 2006, which is hereby incorporated by reference, Tan et al. disclose a full-function all-dielectric trim retarder wherein A-plate retardance is provided by a transversely-inhomogeneous one-dimensional grating structure, and −C-plate retardance is provided by the axially-inhomogeneous one-dimensional FBAR grating structure discussed above.

Another method of introducing form birefringence in a dielectric material is to use oblique angle deposition, wherein a thin dielectric film is deposited, either by evaporation or sputtering, at an angle, to provide a porous form-birefringent layer. More specifically, and as illustrated in FIG. 3, this technique uses oblique incident vapor flux 40 to effect atomic shadowing 42 on a substrate 44 and provide microstructures with isolated columns of material 46 growing toward the vapour source. The optical properties of the thin film are dependent on the material used, the porosity of the microstructure, and the orientation of the columns. In general, the orientation of the columns is related to the incident vapor flux angle $\theta_v$ (angle of incidence measured from the normal). While the incident vapor flux angle $\theta_v$ may be anywhere between 0° and 90°, the trend is to use high angles of incidence (e.g., greater than 75°) to maximize the tilt of the columnar microstructure.

For example, in U.S. Pat. No. 5,638,197, Gunning et al. discloses an inorganic thin film 'O-plate' compensator for improving gray scale performance in twisted nematic (TN) type LCDs. The optimum deposition angle, $\theta_v$ is reported to be 76°.

In U.S. Pat. No. 6,097,460, Shimizu et al. disclose a phase retarder film containing $TiO_2$ that can be utilized for improving the viewing angle characteristics of a TN-type LCD or a super twisted nematic (STN) type LCD. In order to provide the required A-plate retardation values ranging between 20 nm to 200 nm, the incident vapour flux angle ranges from 50° to 85°.

In U.S. Pat. Nos. 5,866,204 and 6,248,422, Robbie and Brett describe a method of obliquely depositing thin films, wherein in a first stage the incident vapor flux angle (angle of incidence measured from the normal) is fixed at a value typically greater than 80° to produce a porous columnar microstructure, and wherein in a second stage the incident vapor flux angle approaches 0° to provide a dense and uniform capping layer.

In U.S. Pat. No. 7,079,209, Nakagawa teaches a retardation compensator for increasing the viewing angle and/or improving the contrast ratio of a TN-type LCD-based projection system. According to one embodiment, the retardation compensator includes an array of rod-like columns formed by oblique angle deposition as described in U.S. Pat. No. 5,638,197 (e.g., with an optimum deposition angle of about 76°).

While these references do provide form-birefringent thin films via oblique angle deposition, the above-described porous microstructures are not ideal for projection systems. For example in many instances, such as when the substrate is not rotated during the deposition process, the layer thickness and hence the retardation uniformity will be poor. In all instances, a high porosity is expected to cause reliability problems. In particular, the highly porous microstructures may delaminate from the supporting substrate in the high temperature and/or high light flux environment provided in polarization-based projection systems, such as cinematic projector. Also, the porous film is expected to allow moisture to infuse into the birefringent layer(s) thereby changing its retardation property with changing humidity environment.

In addition, the large in-plane birefringence provided by the porous microstructures makes these structures particularly unsuitable for VAN-mode reflective LCD systems (e.g., VAN-mode LCoS projections TVs). In general, it is desired that trim retarders for VAN-mode reflective LCoS systems only exhibit small amounts of in-plane birefringence, to reduce back reflections and/or improve angular tuning of contrast optimization. For example, with respect to the latter, trim retarders with a large in-plane retardance (e.g., over 30 nm) typically exhibit an overly sensitive tuning curve (i.e., contrast level versus clocking angle).

SUMMARY OF THE INVENTION

The instant invention relates to optical retarders having an in-plane birefringence introduced during a thin-film deposition process that uses oblique angles to obtain a dense, form-birefringent layer. According to one embodiment, the dense, form-birefringent layer is deposited with an FBAR stack to provide an all-dielectric trim retarder having fall functionality (i.e., both A-plate and −C-plate birefringence). Advantageously, the dense structure of the full-function trim retarder offers high durability and/or stability, thus making it well suited for providing polarization control in high light flux polarization-based projection systems. Moreover, the magnitude of the in-plane birefringence is suitable for compensating VAN-mode LCoS microdisplay applications.

In accordance with one aspect of the instant invention there is provided an optical retarder comprising: at least one dense, form-birefringent layer formed using an oblique angle deposition, wherein the oblique angle and a total thickness of the at least one dense, form-birefringent layer are selected to provide an A-plate retardance for providing polarization control.

In accordance with another aspect of the instant invention there is provided a method of fabricating an optical retarder comprising: depositing at least one dense, form-birefringent layer on a surface using an oblique angle deposition, wherein the oblique angle and a total thickness of the at least one dense, form-birefringent layer are selected to provide an A-plate retardance for providing polarization control.

In accordance with another aspect of the instant invention there is provided a liquid crystal display based projection system comprising: a light source; a first polarizer for receiving light from the light source and transmitting a first linearly polarized light having a first linear polarization axis; a liquid crystal display panel for optically modulating the first linearly polarized light, the liquid crystal display panel having residual birefringence; a second polarizer for receiving the optically modulated light and for transmitting a second linearly polarized light having a second linear polarization axis; a projection lens for projecting the second linearly polarized light onto a screen; and a trim retarder for compensating the residual birefringence of the liquid crystal display panel, the trim retarder comprising: at least one dense, form-birefringent layer formed using an oblique angle deposition, wherein the oblique angle and a total thickness of the at least one dense, form-birefringent layer are selected to provide an A-plate retardance for compensating the residual in-plane birefringence of the liquid crystal display panel.

In accordance with another aspect of the instant invention there is provided a method of providing polarization control comprising: providing at least one dense, form-birefringent layer formed using an oblique angle deposition, wherein the oblique angle and a total thickness of the at least one dense, form-birefringent layer are selected to provide an A-plate retardance for providing the polarization control.

For the following defined terms, these definitions shall be applied, unless a different definition is given in the claims or elsewhere in this specification.

The term "in-plane" will be understood to describe being parallel to the plane of device, such as in-plane birefringence, in-plane retardance, in-plane retarder axis, etc.

The term "out-of-plane" will be understood to describe being parallel to the device normal, such as out-of-plane birefringence, out-of-plane retardance, etc.

The term "retardation or retardance" will be understood to refer to the difference between two orthogonal indices of refraction times the thickness of the optical element.

The term "in-plane retardation" will be understood to refer to the product of the difference between two orthogonal in-plane indices of refraction times the thickness of the optical element.

The term "out-of-plane retardation" will be understood to refer to the product of the difference of the index of refraction along the thickness direction (z direction) of the optical element and one in-plane index of refraction times the thickness of the optical element. Alternatively, this term will be understood to refer to the product of the difference of the index of refraction along the thickness direction (z direction) of the optical element and the average of in-plane indices of refraction times the thickness of the optical element.

The term "birefringent" will be understood to refer to having multiple different indices of refraction.

The term "uniaxial" will be understood to refer to having two different indices of refraction (e.g., where at least two of nx, ny and nz are substantially equal).

The term "polarizer" will be understood to include devices commonly referred to as "analysers".

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

As previously discussed, birefringence in obliquely deposited thin film coatings is attributed predominantly to the columnar microstructure of the films, wherein the birefringence is dependent on the shape and direction, or tilt, of the columns. The column direction relative to the surface normal is approximately related to the angle of incidence of the coating material arriving at the substrate by the tangent rule $$\tan \psi = 0.5 \tan \theta_v \quad (1)$$

where $\psi$ is the angle of the column relative to the substrate normal, and $\theta_v$ is the deposition angle relative to the substrate normal. The column angle typically is the direction of the z-axis of the birefringent material. This relationship has been experimentally verified for oxide materials such as $TiO_2$, $Ta_2O_5$ and $ZrO_2$. In contrast, $SiO_2$ has been found to form mostly isotropic films, whereas films of $Ta_2O_5$ are more closely approximated by $$\tan \psi = 0.322 \tan \theta_v \quad (2)$$

The experimental relationship between the in-plane (i.e., normal incidence) birefringence resulting from the columnar structure and the column angle (and thus deposition angle) has been discussed in further detail in a book entitled "Birefringent Thin Films and Polarizing Elements" by Ian Hodgkinson and Qi-hong Wu. For example, at one point the authors of the book plot the experimental birefringence of $Ta_2O_5$ as a function of deposition angle for deposition angles above 40°. Below 40°, the plot is extrapolated using simulated values, wherein the model assumes that all of the coating material at a position on a part is deposited at a same deposition angle $\theta_v$. In summary, their results indicate that one should expect a birefringence of 0.04 for a deposition angle of 52°, a birefringence of 0.03 for a deposition angle of 43°, a birefringence of 0.02 for a deposition angle of 34°, a birefringence of 0.015 for a deposition angle of 28°, a birefringence of 0.01 for a deposition angle of 24°, and a birefringence of 0.005 for a deposition angle of 17°. Porous columnar microstructure is assumed for the extrapolated data.

The instant inventors have experimentally verified that low deposition angles (e.g., under 40°) result in thin films with small to moderate birefringence. The depositions were performed, however, such that the resulting thin films did not exhibit the porous columnar microstructure described above, but rather were fully dense. The instant inventors have discovered that the form birefringence of these fully dense thin films, which is conveniently of an ideal magnitude for compensating for residual birefringence in VAN-mode LCoS microdisplays, is surprisingly stable in high light flux and/or high temperature environments, thus making these films ideal for use in polarization-based projection systems.

Figure 1:
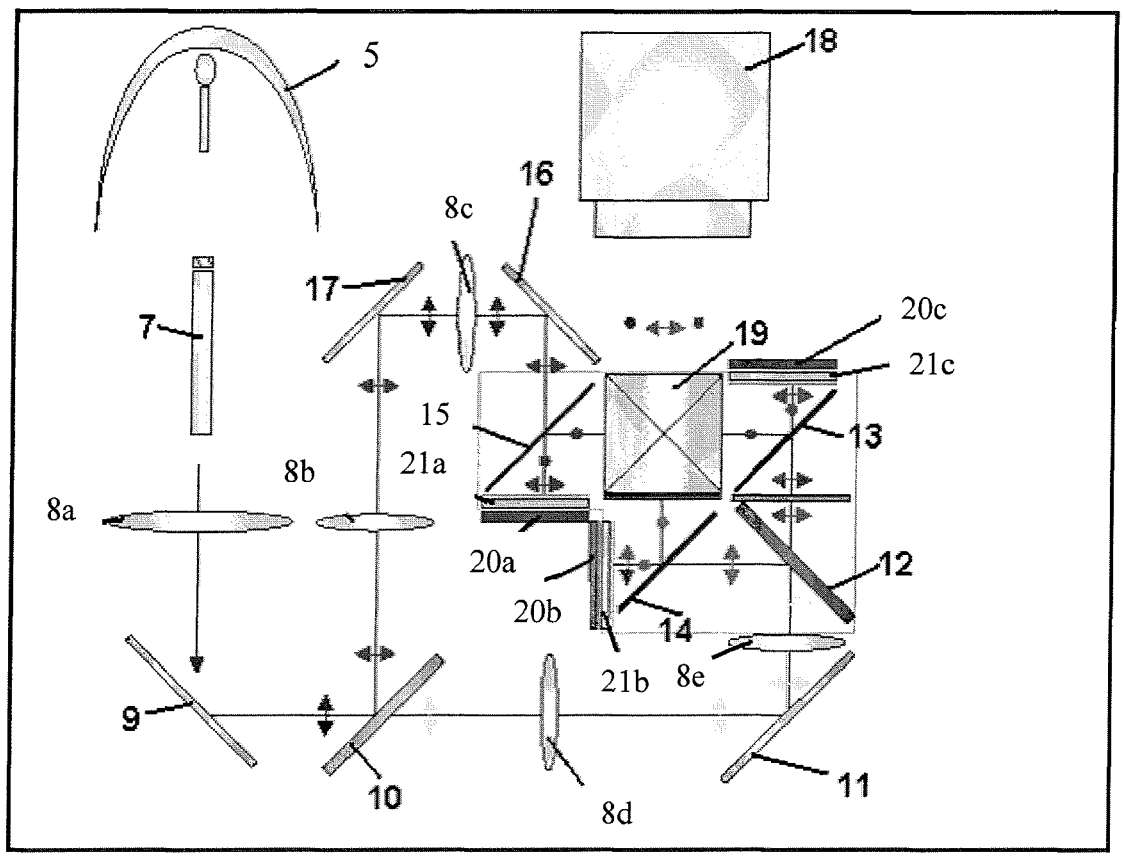
FIG. 1 is a schematic diagram of a prior art 3-panel wire-grid polarizer (WGP) based liquid crystal on silicon (LCOS) projection light engine.
Figure 2:
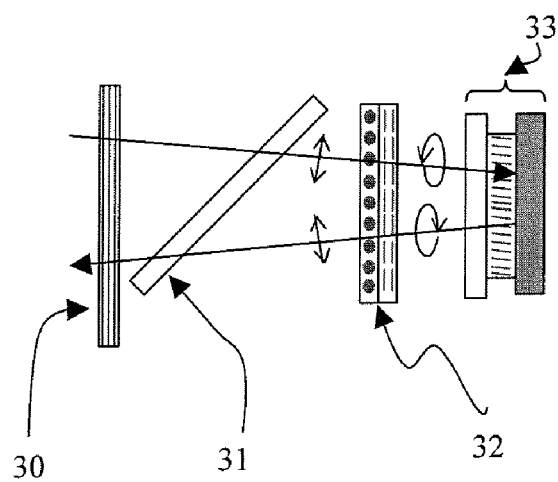
FIG. 2 illustrates the preservation of linear polarization on double passing through a LCoS panel and a trim retarder.
Figure 3:
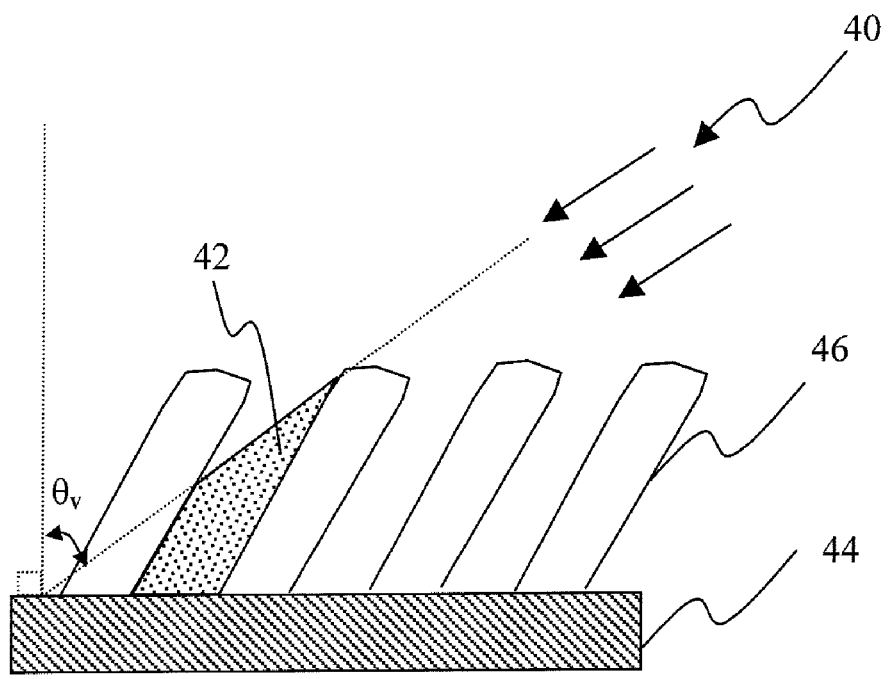
FIG. 3 is a schematic illustration of a glancing angle deposition (GLAD), wherein high angles of incident vapour flux are used to provide form birefringence.
Figure 4:
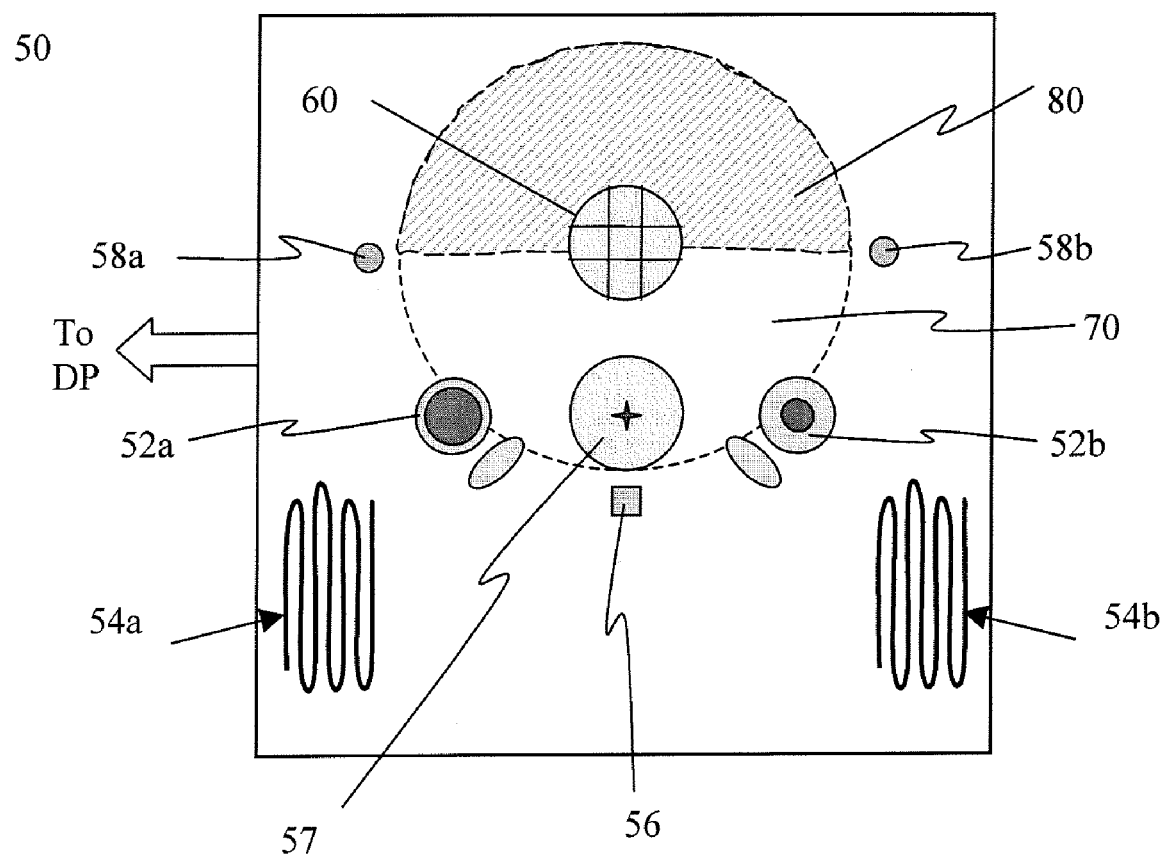
FIG. 4 is a schematic diagram of an apparatus for fabricating a form-birefringent thin-film in accordance with one embodiment of the instant invention.

Referring to FIG. 4, a plan view of an apparatus suitable for depositing the dense thin films is shown. The apparatus 50, which is a 48" diffusion pumped box coater, includes first 52a and second 52b crucibles for holding the material(s) to be deposited, first 54a and second 54b Calrod heaters for heating the chamber, a thermocouple 56 for monitoring the temperature of the chamber, an optical monitor 57, first 58a and second 58b crystal rate monitors, an ion-assisted deposition (IAD) source 60, a mount for supporting the substrate (or part) 70, and an optional 180° mask 80. The crucibles 52a/52b rotate counter-clockwise, the substrate 70 rotates counter-clockwise, and the mask 80 is fixed in position.

For comparison purposes, the apparatus illustrated schematically in FIG. 4 was used for two different deposition procedures. In both procedures, the dense thin film was incorporated into a 4 layer AR coating. More specifically, the dense thin film (i.e., a thick $Ta_2O_5$ layer) was part of a $SiO_2/Ta_2O_5$ alternating stack deposited on a 21" diameter float glass substrate. In the first deposition process, the mask was used to minimize the maximum deposition angle and make the coating thickness uniform across the part. The second deposition was performed unmasked, to obtain the maximum deposition angles on the substrate, and thus, theoretically, the maximum birefringence.

Data for these two runs is given in Table 1. The AR coating obtained from the first, masked deposition process is referred to as configuration 1 (e.g., 1021-1071), whereas the AR coating obtained from the second, unmasked deposition is referred to as configuration 2 (e.g., 1021-1074).

TABLE 1

Run data for birefringence tests.

|  | 1021-1071 | 1021-1074 |
| --- | --- | --- |
| Masking | 180 degree | None |
| Design | AR with thick $Ta_2O_5$ layer | AR with thick $Ta_2O_5$ layer |
| Coating rate, $SiO_2$ | 7.0 Å/sec | 11.9 Å/sec |
| Coating rate, $Ta_2O_5$ | 2.4 Å/sec | 4.5 Å/sec |
| Monitor wavelength | 684 nm | 670 nm |

In both configurations, the AR was centered at 633 nm, the wavelength of the helium-neon laser used to measure retardance, in order to minimize ripple in the retardance measurement caused by laser interference effects from the front and back surface of the sample when the coating reflectance is greater than about 5%. The total thickness of the $Ta_2O_5$ layers was 2.95 µm, while the total thickness of the $SiO_2$ layers was 0.84 µm. It is interesting to note that because the source deposition parameters were the same for both deposition procedures, the deposition rate was about twice as fast for the unmasked as for the masked runs.

Figure 5:
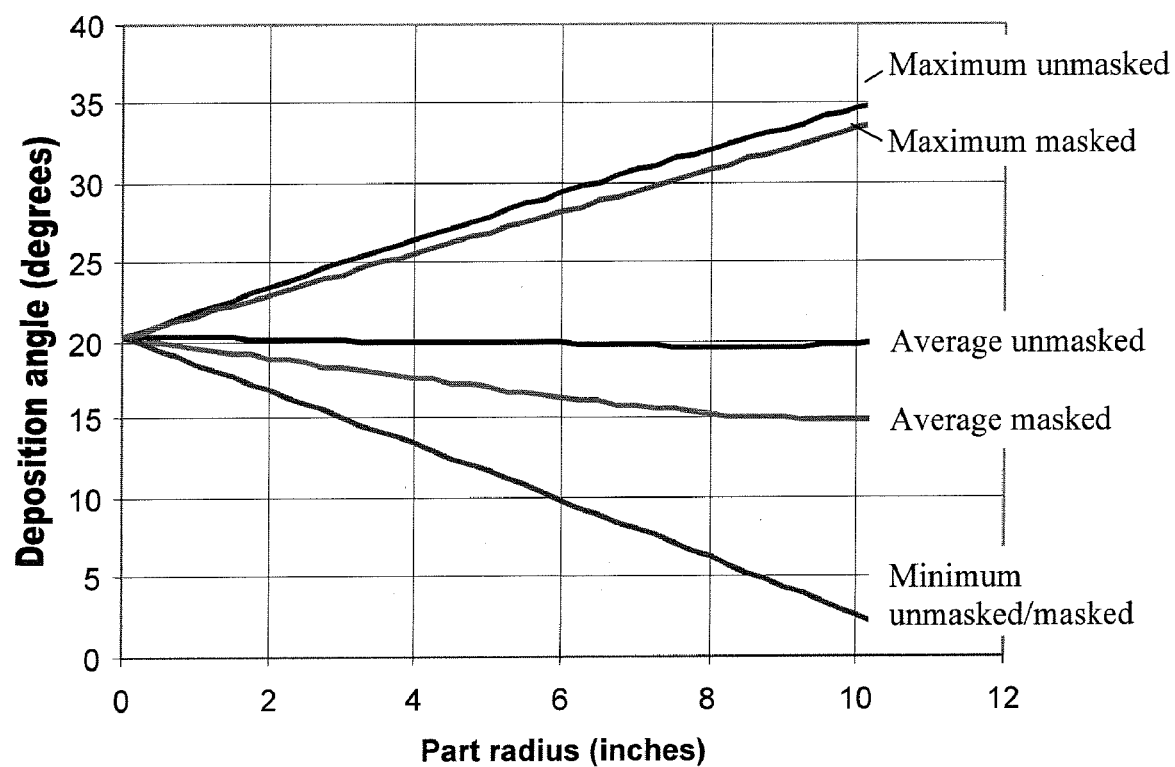
FIG. 5 is a plot of angle of incidence as a function of radial position, for masked and unmasked configurations, calculated using the experimental set-up of the system shown in FIG. 4.

The coating geometry was modeled for both configuration 1 and configuration 2, using a program that predicts coating thickness profiles and deposition angles based on the coating system geometry. Referring to FIG. 5, the theoretical deposition angles incident on the substrate are plotted as a function of radial position. Notably, the minimum angles for the masked and unmasked configurations are the same. Since the substrate, or part, is rotated about its center during deposition, there is rotational symmetry to the coating thickness and the deposition angle distribution. Alternatively, the substrate is moved relative to the incident vapour flux and/or mask with a simple translation or with planetary motion (i.e., is simultaneously rotated about its center and translated along an orbital path).

Equation (2), which predicts the column tilt, $\psi$, from the deposition angle, $\theta_v$, for $Ta_2O_5$, was used as a reference to calculate column tilt. More specifically, Equation (2) was only used as a reference because it assumes that all of the source material arrives at the substrate at the same deposition angle, it does not take into account the angular distribution of the material arriving at a position on the part, and it does not take into account any effects of masking or the difference in deposition rate for the masked and unmasked coatings.

The results indicate that the column tilt for the unmasked coating should be about 6.7° for the average deposition angle, and about 13° for the maximum deposition angle at the outer radius of the part. According to the aforementioned prior art plot, this would result in an in-plane birefringence of about 0.02 for the maximum deposition angle, and about 0.0075 for the average deposition angle. The simulations also predict that the masked coating will exhibit less birefringence than the unmasked coating near the outer radius of the part, since both the average and maximum deposition angles for the masked configuration are less than those for the unmasked.

Figure 6:
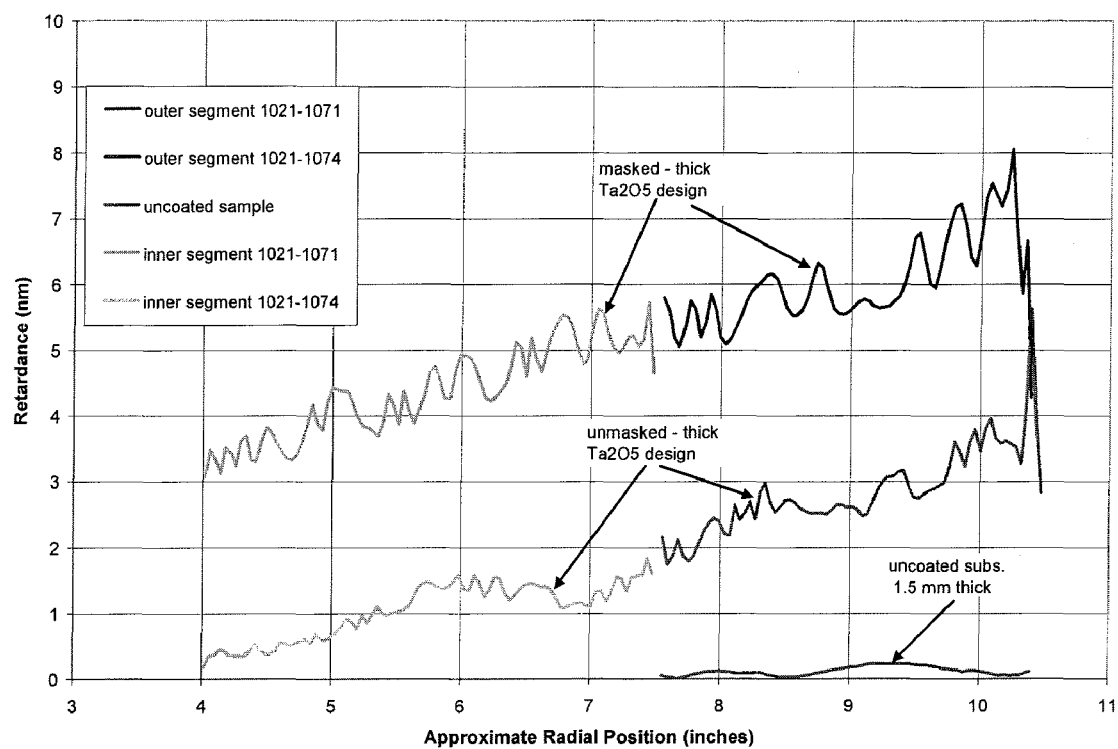
FIG. 6 is a plot of in-plane retardance versus radial position, for masked and unmasked configurations, wherein the normal incidence retardance was measured on an Exicor at 633 nm.

Exicor retardances have been measured and compared to these modelled results. The retardation experiments were performed on small segments cut from the 21" diameter substrate. The in-plane retardance, at normal incidence, was measured at 633 nm on each segment in 1 mm steps, scanned along the approximate radial direction of the original part. An uncoated segment of the same substrate was also measured as a reference. The experimental results are shown in FIG. 6. Only one measurement per run is shown, although multiple measurements were made to verify the trends seen. The ripple in the retardance is attributed to the sample reflectance at 633 nm of >5% at some positions on the samples, as the resulting anti-reflection coating was shifted from the target wavelength of 633 nm.

Figure 7:
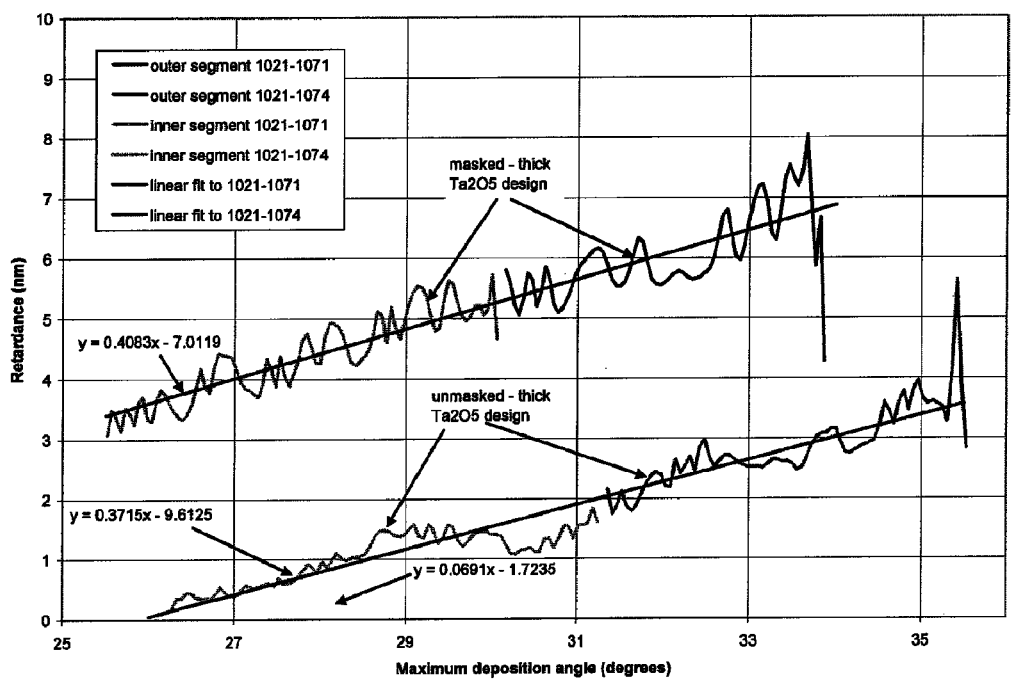
FIG. 7 is a plot of in-plane retardance as a function of maximum deposition angle, for masked and unmasked configurations, calculated using FIGS. 5 and 6.

For all samples, the retardance increased with radial position. This indicates that the retardance is influenced more by the maximum deposition angle than by the average deposition angle, because the maximum deposition angle for both masked and unmasked configurations increases with radial position as shown in FIG. 5. Using the maximum deposition angles for the radial positions from FIG. 5, the experimental retardance is re-plotted as a function of the maximum deposition angle. This plot is shown in FIG. 7.

The physical thickness of the coating influences the measured retardance values according to equation (3)

$$\Gamma = \Delta n d \quad (3)$$

where $\Gamma$ is the retardance in nanometers, $\Delta n$ is the difference in the maximum and minimum refractive indices for the two orthogonal polarizations, and d is the physical thickness in nanometers.

Figure 8:
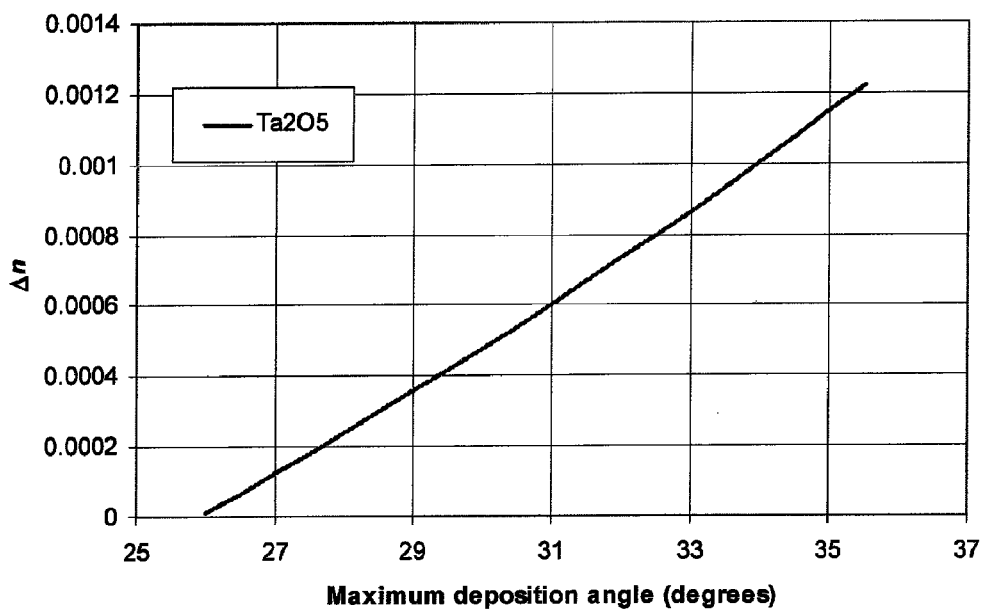
FIG. 8 is a plot of in-plane birefringence as a function of maximum deposition angle, for the unmasked configuration, calculated using FIG. 7.

The unmasked samples have about 11% total thickness variation across the inner and outer segments, with the physical thickness decreasing from the inner to the outer radial positions. The masked run has the same physical thickness as the unmasked run at the radial position around the 9.5" radial position, but is thicker at the lower radial positions. The thickness profile based on the calculated coating geometry was used to model the coating thickness, and with equation (3) was used to calculate the normal incidence, or in-plane birefringence (Δn), for the unmasked runs as a function of maximum deposition angle. For each design, the total retardance due to each coating material is expressed as $$\Gamma = \Delta n_L d_L + \Delta n_H d_H \quad (4)$$

where the L and H subscripts refer to the low refractive index material (i.e., $SiO_2$) and the high refractive index material (i.e., $Ta_2O_5$), respectively. Since $SiO_2$ deposits in a substantially amorphous structure, the birefringence of this material was neglected (preliminary experimental measurements indicated it is very small). Using the retardance data and the $Ta_2O_5$ design thickness, the in-plane birefringence of this material was calculated. FIG. 8 illustrates the in-plane birefringence as a function of the maximum deposition angle. The measured retardance was approximated by a linear function for this calculation over this narrow angle range.

Figure 9:
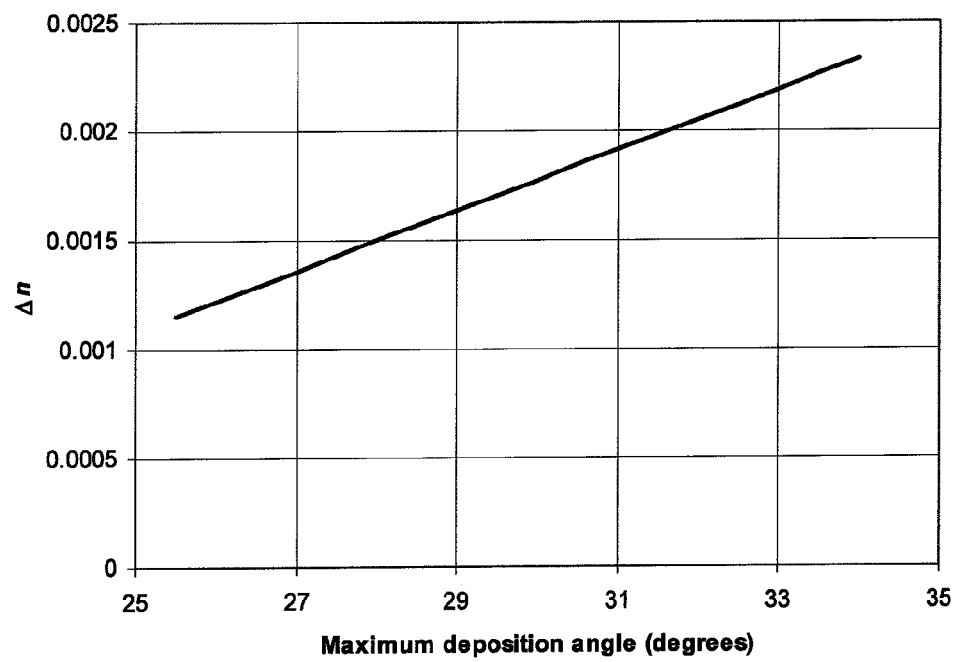
FIG. 9 is a plot of in-plane birefringence as a function of maximum deposition angle, for the masked configuration, calculated using FIG. 7.

The masked sample had less than 1.5% thickness variation across the measured radial positions, not enough to be distinguished in the measurement ripple, so the physical thickness was assumed to be constant. Again, the birefringence of the $SiO_2$ was assumed to be negligible and all of the retardance was attributed to the $Ta_2O_5$ layers. The in-plane Δn of the coating was calculated from equation (3). FIG. 9 is a plot of this calculated in-plane Δn for the masked coatings. For this calculation, the measured retardance as a function of maximum deposition angle is approximated by a linear function.

Notably, the samples from the masked run had a higher in-plane birefringence than the unmasked ones by about a factor of 2. This is the opposite of what one would expect from the deposition angles (i.e., since the masked configuration had lower maximum and average deposition angles than the unmasked configuration). The difference in birefringence for these two configurations, is thus believed to be due to the difference in deposition rates, or more likely, the belief that the mask is influencing the columnar structure as it blocks the coating flux during half of the part rotation cycle.

The birefringence of both samples was less than that predicted by the prior art plot, wherein all of the coating flux was incident at a single angle of incidence. The incident cone of coating flux may be "rounding" the columnar structure (reducing its directionality), so that the birefringence is less.

The in-plane retardance of current, commercially available trim retarders for VAN-mode LCoS microdisplays is typically in the range between about 2-7 nm. The amount of in-plane birefringence exhibited by $Ta_2O_5$ at the outer radius of the disk, 0.0012 unmasked and 0.0023 masked, is in the appropriate range to make a trim retarder with a reasonable coating thicknesses (e.g., less than 6 μm thick).

Figure 10:
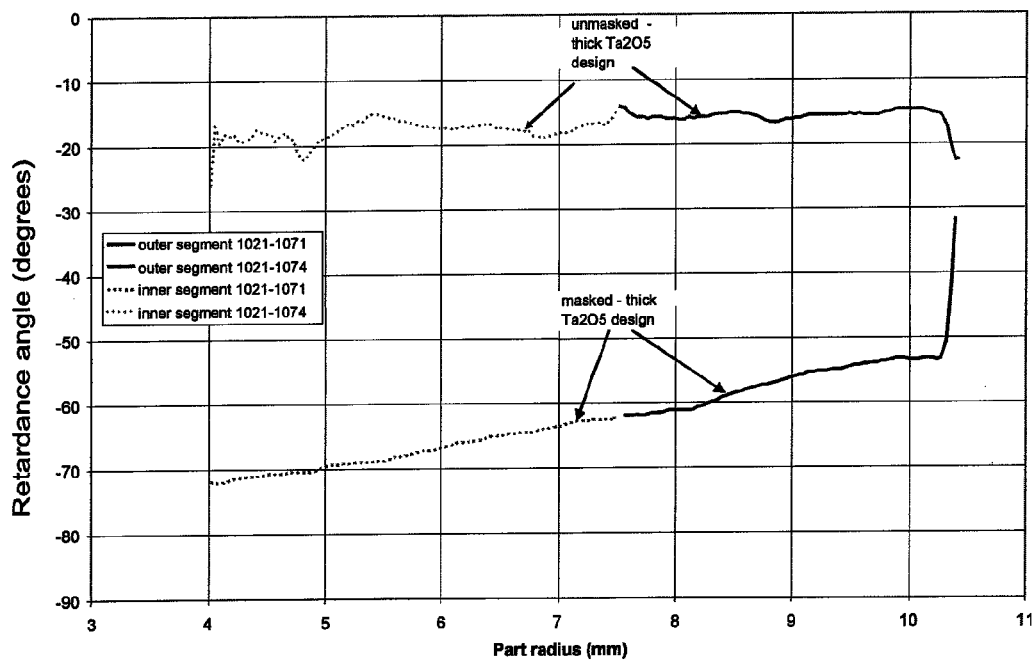
FIG. 10 shows the retardance angle measured at normal incidence on the Exicor at 633 as a function of radial position.
Figure 11:
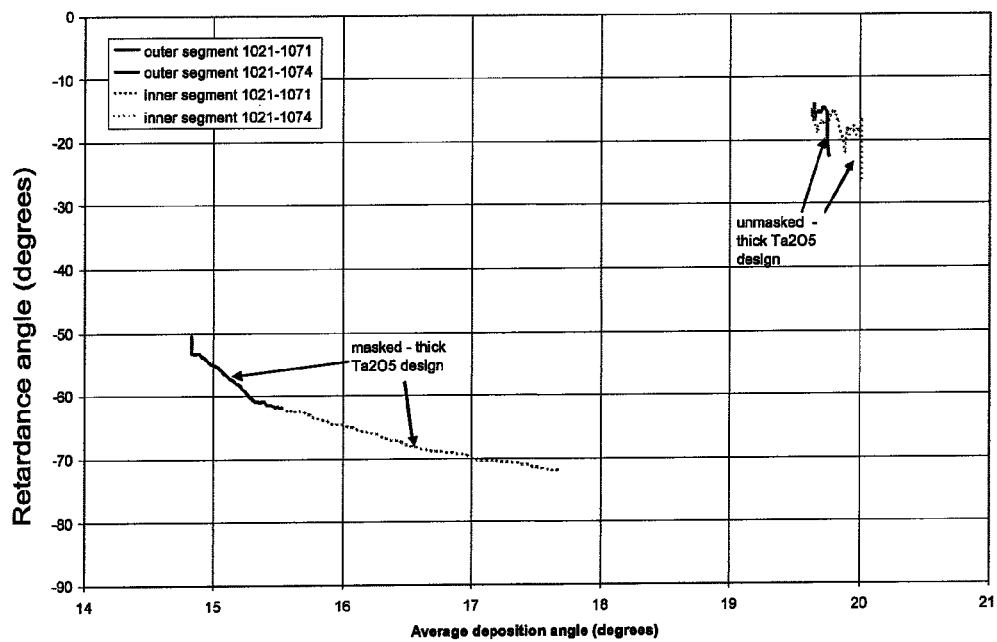
FIG. 11 shows the measured retardance angle from FIG. 10 plotted as a function of average deposition angle at that position on the part.

The Exicor measurements also yielded a measure of the orientation of the fast axis of the birefringent material relative to the x direction of the part scan. This scan direction was approximately aligned to the radius of the 21" diameter part. For a trim retarder, the fast axis needs to have a constant orientation in a linear direction across the part to provide optimum performance. FIG. 10, which is a plot of this data for the masked and unmasked samples, shows that the unmasked sample had a more uniform fast axis orientation than the masked sample. More specifically, FIG. 10 shows a plot of retardance angle versus average deposition angle, wherein the retardance angle is the angle the fast axis of the birefringent material makes with respect to the x scan direction. FIG. 11 shows this same retardance plotted as a function of the calculated average deposition angle.

For each of the coating configurations, masked and unmasked, there appears to be a correlation between the average deposition angle and the axis orientation of the material birefringence. However, there is a marked difference between the orientation angles for the masked and unmasked configurations. This is possibly related to an effect of the masking on the columnar growth, and thus the material orientation.

Each of the coating configurations, masked and unmasked, was also subject to environmental tests. More specifically, samples from the outer radius of each part were submitted to humidity, adhesion and abrasion testing. The environmental test results, which are summarized in Table 2, indicate that the coatings are highly durable.

TABLE 2

Environmental results for coating runs.

| Test (sequential) | 1021-1071 | 1021-1074 |
|---|---|---|
| 24 hr. humidity | Pass | Pass |
| Quick tape | Pass | Pass |
| 20 rub eraser | Pass | Pass |

Each of the coating configurations, masked and unmasked, was also subject to transmission electron microscopy (TEM) to examine the layer structure. In general, the TEM micrographs indicated that the thin films were substantially amorphous. While some of the micrographs exhibited possible evidence of columnar microstructure, there was definitely a lack of distinct columns and/or voids. Moreover, some of the TEM micrographs exhibited speckled or blotchy regions in the thick $Ta_2O_5$ layer. The speckled nanostructure, which was more pronounced for the masked runs than the unmasked runs, may be related to the unexpectedly higher in-plane birefringence of the masked run than the unmasked runs. In each TEM micrograph, the thin films appear to be quite dense (i.e., not highly porous). A rough estimation of $Ta_2O_5$ film density using RBS and SEM characterizations is 93% for the masked configuration and 98% for the unmasked configuration. Moisture-shift tests on filters prepared using the above-described method(s) suggest that the coatings are nominally fully-dense (i.e. very close or equal to 100% or "bulk" density). In the moisture shift test, the filter was measured in a dry condition, exposed to 24 hour humidity, then re-measured. The coatings exhibited essentially no change in wavelength. If the coatings were not fully-dense, a shift to a longer wavelength would be expected after exposure to humidity, since the moisture can penetrate into the coating and partially fill the voids—thus increasing the index slightly and moving the filter response to a higher wavelength.

Notably, it is quite unexpected for a fully dense, substantially amorphous thin film (i.e., with little or no columnar microstructure) to exhibit a useful birefringence. To the best knowledge of the instant inventors, no one has exploited the form birefringence of these fully dense, substantially amorphous thin-films and/or their stability in high light flux and/or high temperature environments.

In accordance with one embodiment of the instant invention a fully dense, form-birefringent thin-film is used to provide polarization control in an optical system (e.g., in a liquid crystal display system, in a polarimeter, as a quarter-waveplate, etc.).

In general, form birefringence is introduced into the thin-film via an oblique angle deposition. The deposition process, which is typically a physical vapour deposition using one of a variety of evaporation or sputtering deposition techniques well known to those skilled in the art, is preferably selected and/or altered to ensure that the thin-film is dense (e.g., greater than about 90% bulk density) and exhibits adequate birefringence (e.g., greater than about 0.0002 at 550 nm). For example, at least one of the coating flux incident angle, the coating mask design, the coating source and substrate distance, the coating source and substrate relative positions and orientations, the deposition rate, the substrate spinning control, and the coating material is typically selected to provide the desired birefringence and/or density. Alternatively, or additionally, a high density is achieved by using an energetic process, such as IAD. For example, in the examples described heretofore, the coating flux incident angle included a broad range of deposition angles (e.g., 2 to 35°), the optional coating mask was a 180° mask, the substrate was about 30" away from the crucibles, the deposition rate was between about 2 and 12 Å/sec, the substrate was spun at about 500 rpm, and an IAD source was used. In general, the average deposition angle, or more typically, the maximum deposition angle, will be below about 40".

Advantageously, the dense form-birefringent thin-film is readily fabricated from normally isotropic materials (i.e., not molecularly birefringent), and in particular from inorganic and/or dielectric materials. Accordingly, the dense form-birefringent film is readily incorporated with other thin film layers to provide multi-functional all-dielectric thin film stacks.

In accordance with another embodiment of the instant invention a dense, form-birefringent thin-film layer is incorporated into an AR coating, which is used to provide polarization compensation for a liquid crystal display. For example, in the examples discussed above, a thick $Ta_2O_5$ layer is incorporated into a 4 layer $Ta_2O_5/SiO_2$ AR design. Alternatively, other designs are provided. For example, consider the red band AR coating described in Table 3, wherein the alternating $Ta_2O_5/SiO_2$ stack is deposited on a borofloat substrate (n=1.47), and wherein each layer in the thin-film stack is deposited with a low angle of incidence using the experimental set-up described in FIG. 4.

TABLE 3

Parameters for red band AR coating

| Material | Thickness (nm) |
|---|---|
| Substrate | |
| SiO2 | 115.72 |
| Ta2O5 | 24.53 |
| SiO2 | 34.17 |
| Ta2O5 | 2954.24 |
| SiO2 | 217.16 |
| Ta2O5 | 74.56 |
| SiO2 | 226.31 |
| Ta2O5 | 1196.63 |
| SiO2 | 239.28 |
| Ta2O5 | 11.82 |
| SiO2 | 219.28 |
| Ta2O5 | 38.59 |
| SiO2 | 126.42 |
| Air | |

Figure 12:
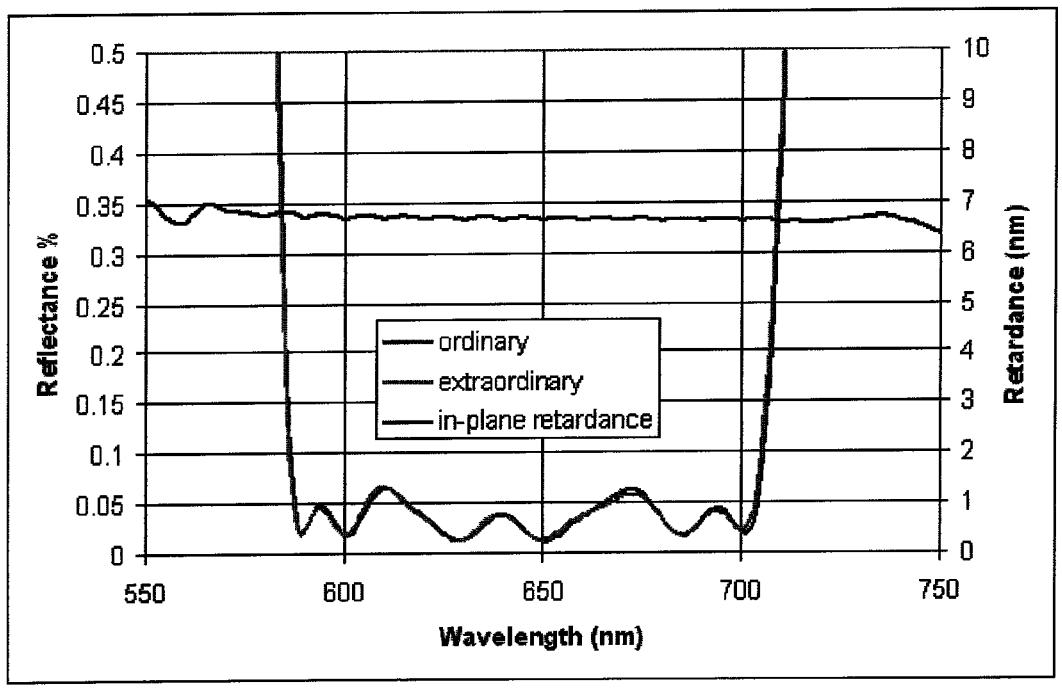
FIG. 12 shows the retardance of a red band AR coating as a function of wavelength.

As illustrated in FIG. 12, the red band AR coating, which is about 7.5 μm thick, provides an average in-plane retardance of about 6.8 nm. Conveniently, the corresponding level of birefringence is suitable for the manufacture of low retardance trim retarders for VAN-mode LCoS systems. Moreover, since the all-dielectric thin film stack lacks distinct column/void microstructure, the birefringence is expected to be extremely stable in the high light flux and/or high temperature environment provided by microdisplay projection systems.

In accordance with another embodiment of the instant invention, a dense, form-birefringent thin-film layer is incorporated into a stand-alone all-dielectric trim retarder, which is used to compensate for residual birefringence of a VAN-mode LCoS microdisplay projection system.

Figure 13:
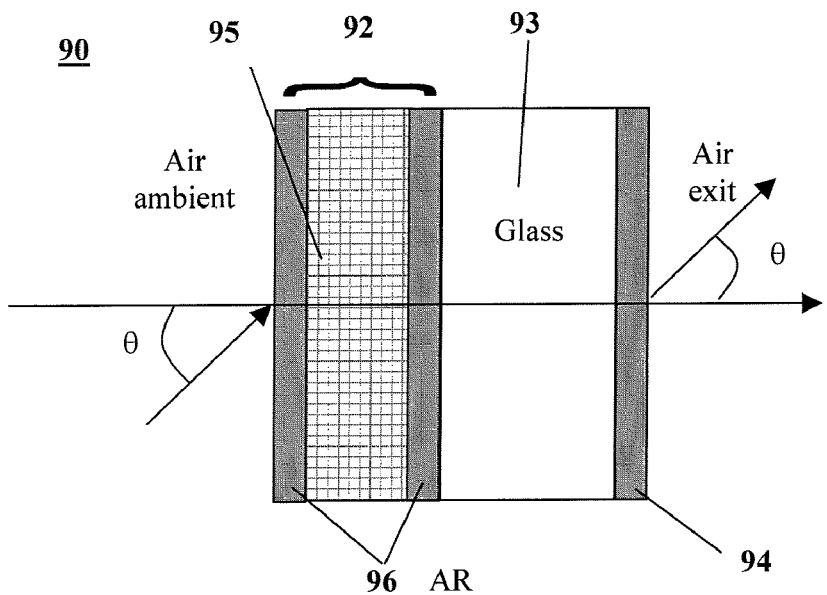
FIG. 13 is a schematic diagram of an all-dielectric trim retarder, wherein A-plate retardance is provided by a dense, form-birefringent layer.

Referring to FIG. 13, there is shown an embodiment of an all-dielectric trim retarder for improving image contrast in a VAN-mode LCoS microdisplay projection system. The trim retarder 90 has a dielectric thin film stack 92 disposed on a first side of a substrate 93 and an anti-reflection coating 94 disposed on a second opposite side of the substrate 93. The dielectric thin film stack 92, which imparts A-plate functionality to the trim retarder 90, includes a dense, form-birefringent layer 95 bound by AR layers 96. Each AR layer 94, 96, which is typically a dielectric stack, serves as a refractive index matching layer at an interface with an abrupt refractive index change.

In general, form birefringence is introduced into the dense, form-birefringent layer 95 via an oblique angle deposition. The deposition process, which is typically a physical vapour deposition using one of a variety of evaporation or sputtering deposition techniques well known to those skilled in the art, is preferably selected and/or altered to ensure that the thin-film is dense (e.g., greater than about 90% bulk density) and exhibits adequate birefringence (e.g., greater than about 0.0002 at 550 nm). For example, at least one of the coating flux incident angle, the coating mask design, the coating source and substrate distance, the coating source and substrate relative positions and orientations, the deposition rate, the substrate spinning control, and the coating material is typically selected to provide the desired birefringence and/or density. Alternatively, or additionally, a high density is achieved by using an energetic process, such as IAD. For example, in the examples described heretofore, the coating flux incident angle included a broad range of deposition angles (e.g., 2 to 35°), the optional coating mask was a 180° mask, the substrate was about 30" away from the crucibles, the deposition rate was between about 2 and 12 Å/sec, the substrate was spun at about 500 rpm, and an IAD source was used. In general, the average deposition angle, or more typically, the maximum deposition angle, will be below about 40°.

Notably, the thin film stack 92 is shown to include a single, dense, form-birefringent layer 95 for exemplary purposes only. In accordance with other embodiments, the thin film stack 92 includes a plurality of thinner dense, form-birefringent layers and/or intervening layers (e.g., in an alternating index design). Alternatively, the form-birefringent layer 95 is fabricated from a material with a refractive index similar to the substrate and the inner AR coating is omitted. Further alternatively, the A-plate stack includes at least one dense, form-birefringent layer incorporated into a more complex AR design. In embodiments where the thin film stack includes a single, dense, form-birefringent layer, the form-birefringent layer will be typically fairly thick (e.g., several microns).

Suitable dielectrics for forming the dielectric thin film stack 92 and/or AR layer 94 include metal oxides such as $TiO_2$, $Ta_2O_5$, $ZrO_2$, and $SiO_2$, which are optically isotropic and exhibit high transparency in the visible wavelength spectrum range (e.g., from 400 nm to 700 nm).

The substrate 93 is typically a plane-parallel glass plate substrate, which for example, is about 1 mm thick. Some common substrates that have been used for display applications include Corning 1737F and Schott D263T, both of which use silicate float glass having a nominal index of refraction of 1.52 at λ=550 nm. Alternatively, the substrate is fabricated from another transparent material that provides mechanical support, such as fused silica.

The in-plane retardance of this trim retarder, which in practice may be up to about a quarterwave, is typically targeted for less than 30 nm, and more typically for between about 1 and 10 nm, across the entire visible band. For example, if the trim retarder is targeted for 5 nm of in-plane retardance, and has an effective in-plane birefringence of about 0.002, the single layer A-plate design would require about a 2.5 µm layer. A film of this thickness is well within the capability of any decent coating machine.

Advantageously, the A-plate birefringence is generated by the deposition process itself. Since the dense, form-birefringent layer 95 is readily deposited in standard coating chambers, in tandem with the AR coatings 94/96, a very low cost all-dielectric trim retarder is provided. Moreover, since the trim retarder is fabricated entirely from inorganic dielectric material, a highly durable and/or moisture impervious coating is obtained. Furthermore, since the inorganic dielectric material lacks distinct column/void microstructure, the birefringence is expected to be extremely stable in the high light flux and/or high temperature environment provided by microdisplay projection systems.

Figure 14:
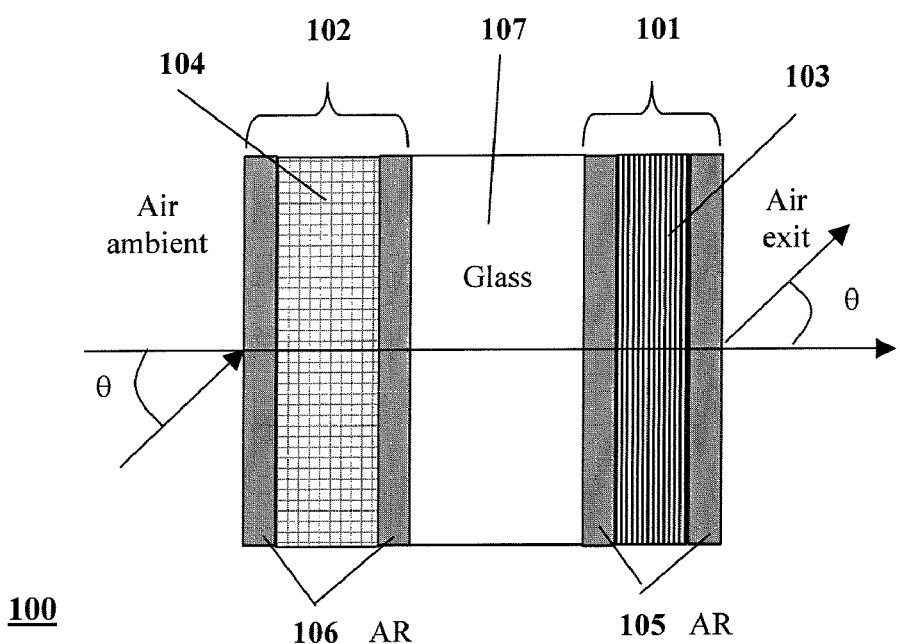
FIG. 14 is a schematic diagram of an all-dielectric full-function A-plate/−C-plate trim retarder, wherein A-plate retardance is provided by a dense, form-birefringent layer disposed on one side of a glass substrate, and −C-plate retardance is provided by an alternating index stack disposed on an opposite side of the glass substrate.

Referring to FIG. 14, there is shown an embodiment of a full-function A/−C plate trim retarder for improving image contrast in a VAN-mode LCoS microdisplay projection system. The trim retarder 100 includes a −C-plate dielectric stack 101, an A-plate dielectric stack 102, and a substrate 107. More specifically, the −C-plate stack 101 is coupled to a first side of the substrate 107, while the A-plate stack 102 is coupled to a second opposite side of the substrate 107.

The −C plate dielectric stack 101 includes a form-birefringent (FB) structure 103 bound by anti-reflection (AR) coatings 105 to provide an FBAR stack with −C-plate functionality. The form-birefringent structure 103 includes a first plurality of layers, each having a first refractive index $n_1$ and a first thickness $d_1$, alternating with at least a second plurality of layers, each having a second refractive index $n_2$ and a second layer thickness of $d_2$. Preferably, each of the layer thicknesses $d_1$ and $d_2$ are a fraction of the operating wavelength (e.g. λ=550 nm) in order to realize the form birefringence effects. In general, the form birefringence will be maximized if the layer thicknesses $d_1$ and $d_2$ are similar, and if the difference between $n_1$ and $n_2$ is large (e.g., greater than about 0.5). For example, an −C-plate stack including 71 pairs of tantala ($Ta_2O_5$) and silica ($SiO_2$) layers, having nominal indices of 2.20 and 1.46 at λ=550 nm, respectively, has been estimated to provide a net retardation of approximately −6.3 nm at 112° angle of incidence in air. When these dielectric layers, which are often less than about 40 nm thick, have approximately equal layer thicknesses, the resulting effective index of the stack is about 2.

The A-plate dielectric stack 102 includes a dense, form-birefringent layer 104 bound by AR layers 106. In general, form birefringence is introduced into the dense, form-birefringent layer 104 via an oblique angle deposition. The deposition process, which is typically a physical vapour deposition using one of a variety of evaporation or sputtering deposition techniques well known to those skilled in the art, is preferably selected and/or altered to ensure that the thin-film is dense (e.g., greater than about 90% bulk density) and exhibits adequate birefringence (e.g., greater than about 0.0002 at 550 nm). For example, at least one of the coating flux incident angle, the coating mask design, the coating source and substrate distance, the coating source and substrate relative positions and orientations, the deposition rate, the substrate spinning control, and the coating material is typically selected to provide the desired birefringence and/or density. Alternatively, or additionally, a high density is achieved by using an energetic process, such as IAD. For example, in the examples described heretofore, the coating flux incident angle included a broad range of deposition angles (e.g., 2 to 35°), the optional coating mask was a 180° mask, the substrate was about 30" away from the crucibles, the deposition rate was between about 2 and 12 Å/sec, the substrate was spun at about 500 rpm, and an IAD source was used. In general, the average deposition angle, or more typically, the maximum deposition angle, will be below about 40°.

Notably, the A-plate dielectric stack 102 is shown to include a single, dense, form-birefringent layer 104 for exemplary purposes only. In accordance with other embodiments, the A-plate stack 102 includes a plurality of thinner dense, form-birefringent layers and/or intervening layers (e.g., in an alternating index design). Alternatively, the form-birefringent layer 104 is fabricated from a material with a refractive index similar to the substrate and the inner AR coating is omitted. Further alternatively, the A-plate stack includes at least one dense, form-birefringent layer incorporated into a more complex AR design. In embodiments where the A-plate dielectric stack includes a single, dense, form-birefringent layer, the form-birefringent layer will be typically fairly thick (e.g., several microns), whereas embodiments wherein the A-plate dielectric stack 102 includes a plurality of dense, form-birefringent layer, the form-birefringent layers will be typically relatively thin.

In each of the −C-plate and A-plate dielectric stacks, each AR layer 105/106, which is typically a dielectric stack, serves as a refractive index matching layer at an interfaces with an abrupt index change. The AR coatings 105/106 may also provide an additional out-of-plane retardance component that should be factored in to the overall retardance and phase difference when the trim retarder is being manufactured.

Suitable dielectrics for forming the −C-plate dielectric stack 101 and/or the A-plate dielectric stack 102 include metal oxides such as $TiO_2$, $Ta_2O_5$, $ZrO_2$, and $SiO_2$, which are optically isotropic and exhibit high transparency in the visible wavelength spectrum range (e.g., from 400 nm to 700 nm).

The substrate 107 is typically a plane-parallel glass plate substrate, which for example, is about 1 mm thick. Some common substrates that have been used for display applications include Corning 1737F and Schott D263T, both of which use silicate float glass having a nominal index of refraction of 1.52 at λ=550 nm. Alternatively, the substrate is fabricated from another transparent material that provides mechanical support, such as fused silica.

The in-plane retardance of this trim retarder, which in practice may be up to about a quarterwave, is typically targeted for less than 30 nm, and more typically for between about 1 and 10 nm, across the entire visible band. For example, if the trim retarder is targeted for 5 nm of in-plane retardance, and has an effective in-plane birefringence of about 0.002, the single layer A-plate design would require about a 2.5 µm layer. A film of this thickness is well within the capability of any decent coating machine. The out-of-plane retardance of this trim retarder, is typically targeted in the range from about −1 nm to about −1000 nm, across the entire visible band.

Advantageously, both the A-plate retardance and the −C-plate retardance are provided by inorganic and/or dielectric materials. Accordingly, both the A-plate stack and −C-plate stack are readily deposited in standard coating chambers, to provide a low cost all-dielectric trim retarder. Moreover, since the full-function trim retarder is fabricated entirely from inorganic dielectric material, a highly durable and/or moisture impervious coating is obtained. Furthermore, since the inorganic dielectric material lacks distinct column/void microstructure, the birefringence is expected to be extremely stable in the high light flux and/or high temperature environment provided by microdisplay projection systems.

Figure 15:
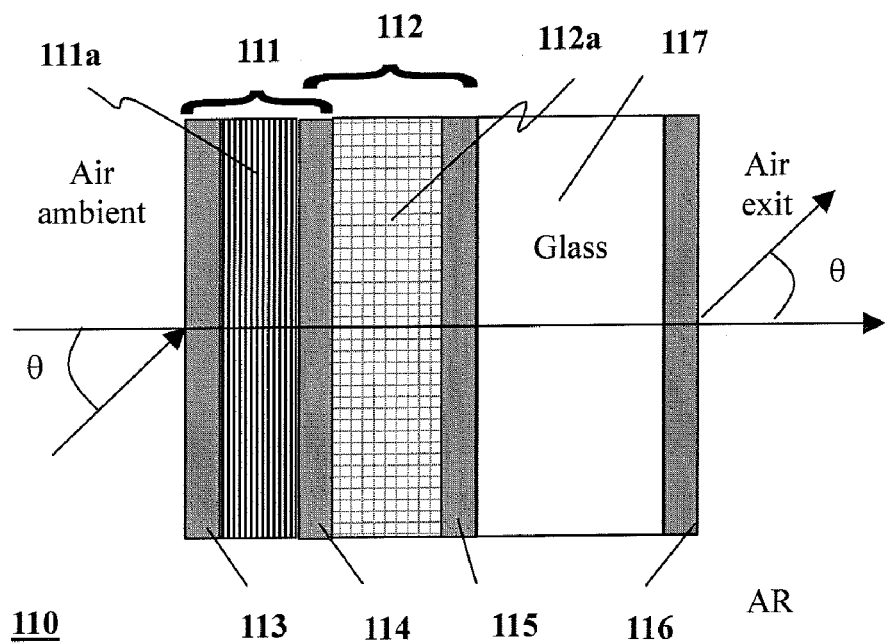
FIG. 15 is a schematic diagram of an all-dielectric full-function A-plate/−C-plate trim retarder, wherein A-plate retardance is provided by a dense, form-birefringent layer disposed on one side of a glass substrate, and −C-plate birefringence is provided by an alternating index stack disposed on the same side of the glass substrate.

Referring to FIG. 15, there is shown another embodiment of a full-function A/−C plate trim retarder for improving image contrast in a VAN-mode LCoS microdisplay projection system. The trim retarder 110 includes a −C-plate dielectric stack 111, a A-plate dielectric stack 112, a plurality of AR layers 113, 114, 115, and 116, and a substrate 117. More specifically, both the −C-plate dielectric stack 111 and the A-plate dielectric stack 112 are coupled to a first side of the substrate 117, while an AR layer 116 is coupled to a second opposite side of the substrate 117.

The −C plate dielectric stack 111 includes a form-birefringent (FB) structure 111a bound by anti-reflection (AR) coatings 113/114 to provide an FBAR stack with −C-plate functionality. The form-birefringent structure 111a includes a first plurality of layers, each having a first refractive index $n_1$ and a first thickness $d_1$, alternating with at least a second plurality of layers, each having a second refractive index $n_2$ and a second layer thickness of $d_2$. Preferably, each of the layer thicknesses $d_1$ and $d_2$ are a fraction of the operating wavelength (e.g. $\lambda$=550 nm) in order to realize the form birefringence effects. In general, the form birefringence will be maximized if the layer thicknesses $d_1$ and $d_2$ are similar, and if the difference between $n_1$ and $n_2$ is large (e.g., greater than about 0.5). For example, an −C-plate stack including 71 pairs of tantala ($Ta_2O_5$) and silica ($SiO_2$) layers, having nominal indices of 2.20 and 1.46 at $\lambda$=550 nm, respectively, has been estimated to provide a net retardation of approximately −6.3 nm at ±12° angle of incidence in air. When these dielectric layers, which are often less than about 20 nm thick, have approximately equal layer thicknesses, the resulting effective index of the stack is about 2.

The A-plate dielectric stack 112 includes a dense, form-birefringent layer 112a bound by AR layers 114/115. In general, form birefringence is introduced into the dense, form-birefringent layer 112a via an oblique angle deposition. The deposition process, which is typically a physical vapour deposition using one of a variety of evaporation or sputtering deposition techniques well known to those skilled in the art, is preferably selected and/or altered to ensure that the thin-film is dense (e.g., greater than about 90% bulk density) and exhibits adequate birefringence (e.g., greater than about 0.0002 at 550 nm). For example, at least one of the coating flux incident angle, the coating mask design, the coating source and substrate distance, the coating source and substrate relative positions and orientations, the deposition rate, the substrate spinning control, and the coating material is typically selected to provide the desired birefringence and/or density. Alternatively, or additionally, a high density is achieved by using an energetic process, such as IAD. For example, in the examples described heretofore, the coating flux incident angle included a broad range of deposition angles (e.g., 2 to 35°), the optional coating mask was a 180° mask, the substrate was about 30" away from the crucibles, the deposition rate was between about 2 and 12 Å/sec, the substrate was spun at about 500 rpm, and an IAD source was used. In general, the average deposition angle, or more typically, the maximum deposition angle, will be below about 40°.

Notably, the A-plate dielectric stack 112 is shown to include a single, dense, form-birefringent layer 112a for exemplary purposes only. In accordance with other embodiments, the A-plate stack includes a plurality of thinner dense, form-birefringent layers and/or intervening layers (e.g., in an alternating index design). Alternatively, the form-birefringent layer is fabricated from a material with a refractive index similar to the substrate and the inner AR coating 115 is omitted. Further alternatively, the A-plate stack includes at least one dense, form-birefringent layer incorporated into a more complex AR design. In embodiments where the A-plate dielectric stack includes a single, dense, form-birefringent layer, the form-birefringent layer will be typically fairly thick (e.g., several microns), whereas embodiments wherein the A-plate dielectric stack is replaced with a plurality of dense, form-birefringent layer, the form-birefringent layers will be typically relatively thin.

Each of the AR layers 113, 114, 115, and 116, which is typically a dielectric stack, serves as refractive index matching layer at an interface with an abrupt index change. The AR coatings 113, 114, 115, and 116 may also provide an additional out-of-plane retardance component that should be factored in to the overall retardance and phase difference when the trim retarder is being manufactured.

Suitable dielectrics for forming the −C-plate dielectric stack 111 and/or the A-plate dielectric stack 112 include metal oxides such as $TiO_2$, $Ta_2O_5$, $ZrO_2$, and $SiO_2$, which are optically isotropic and exhibit high transparency in the visible wavelength spectrum range (e.g., from 400 nm to 700 nm).

The substrate 117 is typically a plane-parallel glass plate substrate, which for example, is about 1 mm thick. Some common substrates that have been used for display applications include Corning 1737F and Schott D263T, both of which use silicate float glass having a nominal index of refraction of 1.52 at $\lambda$=550 nm. Alternatively, the substrate is fabricated from another transparent material that provides mechanical support, such as fused silica.

The in-plane retardance of this trim retarder, which in practice may be up to about a quarterwave, is typically targeted for less than 30 nm, and more typically for between about 1 and 10 nm, across the entire visible band. For example, if the trim retarder is targeted for 5 nm of in-plane retardance, and has an effective in-plane birefringence of about 0.002, the single layer A-plate design would require about a 2.5 µm layer. A film of this thickness is well within the capability of any decent coating machine. The out-of-plane retardance of this trim retarder, is typically targeted in the range from about −1 nm to about −1000 nm, across the entire visible band.

Advantageously, both the A-plate retardance and the −C-plate retardance are provided by inorganic and/or dielectric materials. Accordingly, both the A-plate stack and −C-plate stack are readily deposited in standard coating chambers, to provide a low cost all-dielectric trim retarder. Moreover, since the full-function trim retarder is fabricated entirely from inorganic dielectric material, a highly durable and/or moisture impervious coating is obtained. Furthermore, since the inorganic dielectric material lacks distinct column/void microstructure, the birefringence is expected to be extremely stable in the high light flux and/or high temperature environment provided by microdisplay projection systems.

In the embodiment discussed with reference to FIG. 15, the −C-plate dielectric stack 111 is cascaded onto the dense A-plate dielectric stack. In an alternate embodiment, the A-plate dielectric stack is cascaded onto the –C-plate dielectric stack 111.

Figure 16:
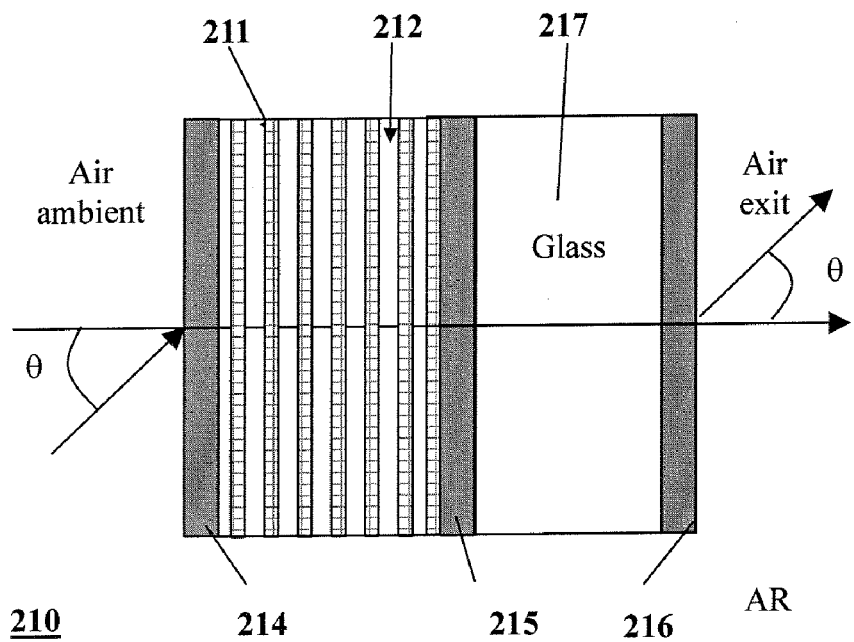
FIG. 16 is a schematic diagram of an all-dielectric full-function A-plate/−C-plate trim retarder, wherein both the A-plate and −C-plate retardance is provided by an alternating index stack of dense, form-birefringent layers.

Referring to FIG. 16, there is shown another embodiment of a full-function A/–C plate trim retarder for improving image contrast in a VAN-mode LCoS microdisplay projection system. The trim retarder 210 includes a dielectric stack having a first plurality of high-refractive index layers 211, alternating with a second plurality of low-refractive index layers 212, and bound by AR layers 214, 215. The dielectric stack is coupled to one side of the substrate 217, while another AR layer 216 is coupled to a second opposite side of the substrate 217.

The layer thickness of each of the first and second plurality of layers is selected such that the dielectric stack provides –C-plate functionality. At least one of the first and second plurality of layers is formed with an oblique angle deposition. The deposition process, which is typically a physical vapour deposition using one of a variety of evaporation or sputtering deposition techniques well known to those skilled in the art, is preferably selected and/or altered to ensure that the dielectric stack is dense (e.g., greater than about 90% bulk density) and exhibits adequate A-plate birefringence (e.g., greater than about 0.0002 at 550 nm). For example, since the layer thickness will be typically below about 100 nm, and often less than about 20 nm, to provide the appropriate –C-plate birefringence, a higher angle of incidence may be required to provide a higher A-plate retardance, thus requiring an adjustment to at least one of the deposition rate, the substrate spinning control, and the energetic process, to ensure that the microstructure is non-porous.

Each of the AR layers 214, 215, and 216, which is typically a dielectric stack, serves as refractive index matching layer at an interface with an abrupt index change. The AR coatings may also provide an additional out-of-plane retardance component that should be factored in to the overall retardance and phase difference when the trim retarder is being manufactured.

Suitable dielectrics for forming the dielectric stack include metal oxides such as $TiO_2$, $Ta_2O_5$, $ZrO_2$, and $SiO_2$, which are optically isotropic and exhibit high transparency in the visible wavelength spectrum range (e.g., from 400 nm to 700 nm).

The substrate 217 is typically a plane-parallel glass plate substrate, which for example, is about 1 mm thick. Some common substrates that have been used for display applications include Corning 1737F and Schott D263T, both of which use silicate float glass having a nominal index of refraction of 1.52 at $\lambda$=550 nm. Alternatively, the substrate is fabricated from another transparent material that provides mechanical support, such as fused silica.

The in-plane retardance of this trim retarder, which in practice may be up to about a quarterwave, is typically targeted for less than 30 nm, and more typically for between about 1 and 10 nm, across the entire visible band. The out-of-plane retardance of this trim retarder, is typically targeted in the range from about –1 nm to about –1000 nm, across the entire visible band.

Advantageously, both the A-plate retardance and the –C-plate retardance are provided by the same inorganic dielectric materials, thus simplifying the deposition procedure. Moreover, since the full-function trim retarder is fabricated entirely from inorganic dielectric material, a highly durable and/or moisture impervious coating is obtained. Furthermore, since the inorganic dielectric material lacks distinct column/void microstructure, the birefringence is expected to be extremely stable in the high light flux and/or high temperature environment provided by microdisplay projection systems.

In accordance with another embodiment of the instant invention, a dense, form-birefringent thin-film layer is incorporated into an all-dielectric trim retarder integrated with another optical component, which is used to compensate for residual birefringence of a VAN-mode LCoS microdisplay projection system.

Figure 17:
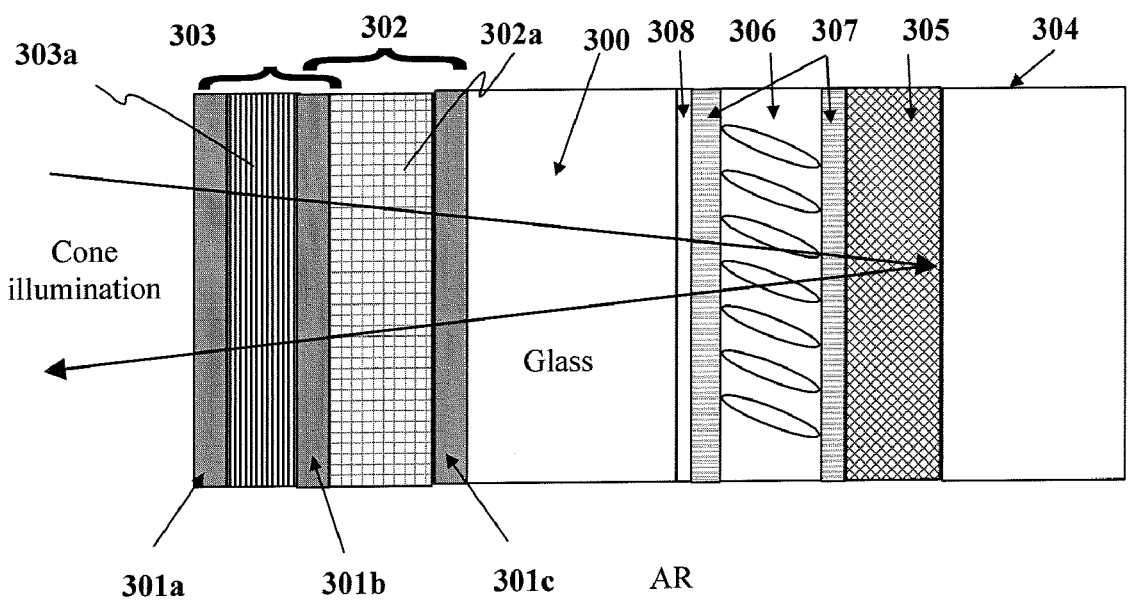
FIG. 17 is a schematic diagram of an integrated display panel lid, incorporating an all-dielectric full-function A/−C plate trim retarder.

Referring to FIG. 17, there is shown an embodiment of a full-function A/–C plate trim retarder integrated in a display panel cover of a VAN-mode LCoS microdisplay projection system. The trim retarder subassembly includes a –C-plate dielectric stack 303, an A-plate dielectric stack 302, and a plurality of AR layers 301, all disposed on a first surface of a transparent cover substrate 300. This trim retarder subassembly forms an LC cell gap, in which LC molecules 306 are disposed, with the top-level metal reflectors 305 disposed on the silicon backplane (substrate) 304. In general, the LCoS also includes alignment layers (e.g., polymeric or obliquely evaporated inorganic layers) 307 and a front transparent conductive electrode (e.g., ITO) 308.

The –C plate dielectric stack 303 includes a form-birefringent (FB) structure 303*a* bound by anti-reflection (AR) coatings 301*a/b* to provide an FBAR stack with –C-plate functionality. The form-birefringent structure 303*a* includes a first plurality of layers, each having a first refractive index $n_1$ and a first thickness $d_1$, alternating with at least a second plurality of layers, each having a second refractive index $n_2$ and a second layer thickness of $d_2$. Preferably, each of the layer thicknesses $d_1$ and $d_2$ are a fraction of the operating wavelength (e.g. $\lambda$=550 nm) in order to realize the form birefringence effects. In general, the form birefringence will be maximized if the layer thicknesses $d_1$ and $d_2$ are similar, and if the difference between of $n_1$ and $n_2$ is large (e.g., greater than about 0.5). For example, an –C-plate stack including 71 pairs of tantala ($Ta_2O_5$) and silica ($SiO_2$) layers, having nominal indices of 2.20 and 1.46 at $\lambda$=550 nm, respectively, has been estimated to provide a net retardation of approximately –6.3 nm at ±12° angle of incidence in air. When these dielectric layers, which are often less than about 20 nm thick, have approximately equal layer thicknesses, the resulting effective index of the stack is about 2.

The A-plate dielectric stack 302 includes a dense, form-birefringent layer 302*a* bound by AR layers 301*b/c*. In general, form birefringence is introduced into the dense, form-birefringent layer 302*a* via an oblique angle deposition. The deposition process, which is typically a physical vapour deposition using one of a variety of evaporation or sputtering deposition techniques well known to those skilled in the art, is preferably selected and/or altered to ensure that the thin-film is dense (e.g., greater than about 90% bulk density) and exhibits adequate birefringence (e.g., greater than about 0.0002 at 550 nm). For example, at least one of the coating flux incident angle, the coating mask design, the coating source and substrate distance, the coating source and substrate relative positions and orientations, the deposition rate, the substrate spinning control, and the coating material is typically selected to provide the desired birefringence and/or density. Alternatively, or additionally, a high density is achieved by using an energetic process, such as IAD. For example, in the examples described heretofore, the coating flux incident angle included a broad range of deposition angles (e.g., 2 to 35°), the optional coating mask was a 180° mask, the substrate was about 30" away from the crucibles, the deposition rate was between about 2 and 12 Å/sec, the substrate was spun at about 500 rpm, and an IAD source was used. In general, the average deposition angle, or more typically, the maximum deposition angle, will be below about 40°.

Notably, the A-plate dielectric stack 302 is shown to include a single, dense, form-birefringent layer for exemplary purposes only. In accordance with other embodiments, the A-plate stack includes a plurality of thinner dense, form-birefringent layers and/or intervening layers (e.g., in an alternating index design). Alternatively, the dense, form-birefringent layer is fabricated from a material with a refractive index similar to the substrate and the inner AR coating 301c is omitted. Further alternatively, the A-plate stack includes at least one dense, form-birefringent layer incorporated into a more complex AR design. In embodiments where the A-plate dielectric stack includes a single, dense, form-birefringent layer, the form-birefringent layer will be typically fairly thick (e.g., several microns), whereas embodiments wherein the A-plate dielectric stack 112 is replaced with a plurality of dense, form-birefringent layer, the form-birefringent layers will be typically relatively thin.

Each of the AR layers 301a-c, which is typically a dielectric stack, serves as refractive index matching layer at an interface with an abrupt index change. The AR coatings 301a-c may also provide an additional out-of-plane retardance component that should be factored in to the overall retardance and phase difference when the trim retarder is being manufactured.

Suitable dielectrics for forming the −C-plate dielectric stack 303 and/or the A-plate dielectric stack 302 include metal oxides such as $TiO_2$, $Ta_2O_5$, $ZrO_2$, and $SiO_2$, which are optically isotropic and exhibit high transparency in the visible wavelength spectrum range (e.g., from 400 nm to 700 nm).

The in-plane retardance of this trim retarder, which in practice may be up to about a quarterwave, is typically targeted for less than 30 nm, and more typically for between about 1 and 10 nm, across the entire visible band. For example, if the trim retarder is targeted for 5 nm of in-plane retardance, and has an effective in-plane birefringence of about 0.002, the single layer A-plate design would require about a 2.5 µm layer. A film of this thickness is well within the capability of any decent coating machine. The out-of-plane retardance of this trim retarder, is typically targeted in the range from about −1 nm to about −1000 nm, across the entire visible band.

In order to provide for a high yield integrated compensator/display, the coarse azimuthal angle offset between the A-plate/−C-plate stacks and the display element 306 may be imposed by mechanically rotating the cover substrate in the plane of the device, having considered the nominal in-plane retardance magnitudes of the two retarder elements. Individual fine-tuning of each integrated compensator/display may involve other non-mechanical means, such as voltage-switching the LC tilt angles in the off-stage to further reduce the overall leakage intensity. More details on non-mechanical fine-tuning is provided in U.S. provisional patent application No. 60/727,969 filed Oct. 18, 2005, the entire contents of which are hereby incorporated by reference. It is noted that the A-plate stack and the −C-plate stack are optionally distributed to both surfaces of the cover substrate 300, provided that the ITO layer allows a substantial fraction of the applied voltage to be available across the LC layer (i.e., the ITO layer is not substantially insulated from the LC layer).

Advantageously, integrating both the A-plate stack and the −C-plate stack in cover substrate of the LCoS, obviates the use of at least two redundant AR coatings (e.g., on the trim retarder and the display panel, each facing the other).

Since both the A-plate stack and the −C-plate stack are formed with inorganic dielectric materials, which are readily deposited in standard coating chambers, a low-cost all-dielectric trim retarder is provided. Moreover, since the full-function trim retarder is fabricated entirely from inorganic dielectric material, a highly durable and/or moisture impervious coating is obtained. Furthermore, since the inorganic dielectric material lacks distinct column/void microstructure, the birefringence is expected to be extremely stable in the high light flux and/or high temperature environment provided by microdisplay projection systems.

In each of the above embodiments, thin-film layers deposited in standard coating chambers and formed entirely from inorganic and/or dielectric materials are used to provide A-plate functionality. These form-birefringent thin film layers are reasonably dense (e.g., density of layer is approximately equal to density of bulk material) and non-porous. As a result, these fully dense thin-films are expected to be highly durable and/or stable in high light flux conditions. Furthermore, since these thin films do not exhibit distinct columns and/or a columnar microstructure, the fabrication can be relatively simple. For example, although a single oblique angle may be used to make the dense thin-film layer(s), the fabrication is simplified by using a range of oblique angles. Accordingly, in addition to providing polarization compensation in LCD applications, the thin-film optical retarders of the instant invention are envisaged as providing a simple, cost-effective approach to polarization control in various other applications.

According to one embodiment, the thin film layers are deposited using a low angle deposition (e.g., less than 40°) and such that the in-plane birefringence ranges between about 0.001 to 0.002 at 630 nm. While the out-of-plane birefringence of these dense layers is unknown, any +C-plate retardance is readily compensated for with a FBAR stack having −C-plate retardance. In fact, the dense, form-birefringent thin-film layers are readily cascaded or otherwise coupled to FBAR thin-film stacks to provide full A/−C-plate functionality. The FBAR stack, or other optional layers, is conveniently formed in the same deposition chamber. Alternatively the FBAR stack, or other optional layers, is formed using another deposition technique (i.e., common deposition techniques include chemical vapor deposition (CVD), plasma enhanced CVD, electron beam evaporation, thermal evaporation, sputtering, and/or atomic layer deposition).

Of course, the above embodiments have been provided as examples only. It will be appreciated by those of ordinary skill in the art that various modifications, alternate configurations, and/or equivalents will be employed without departing from the spirit and scope of the invention. For example, while the instant invention has been discussed with reference to polarization compensation in VAN-mode LCoS projection applications, one skilled in the art will appreciate that the instant invention is also applicable to other LCD applications, such as transmissive VAN-mode LCD applications, which may or may not be projection applications. For example, according to another embodiment the thin-film optical retarder is incorporated into one or both substrates of a transmissive VAN-mode LCD panel. Furthermore, while the trim retarder embodiments discussed heretofore have been described as being incorporated into a liquid crystal cell sub-assembly or used as a stand-alone device in a liquid crystal microdisplay projection system, it is also within the scope of the instant invention to integrate the thin-film optical retarder with other optical components, such as a quarter-wave plate. Accordingly, the scope of the invention is therefore intended to be limited solely by the scope of the appended claims.

The invention claimed is:

1. An optical retarder comprising: a form-birefringent layer formed using an oblique angle deposition, wherein the form-birefringent layer has a predetermined A-plate retardance, wherein the form-birefringent layer is substantially non-porous, wherein the form-birefringent layer is substantially amorphous, and wherein the form-birefringent layer lacks distinct column/void microstructure.

2. An optical retarder according to claim 1, wherein the form-birefringent layer has a density greater than about 90% of the layer material bulk density.

3. An optical retarder according to claim 1, wherein the form-birefringent layer comprises a dielectric thin film.

4. An optical retarder according to claim 1, wherein form-birefringent layer comprises a metal oxide.

5. An optical retarder according to claim 1, wherein the form-birefringent layer consists of $Ta_2O_5$.

6. An optical retarder according to claim 1, wherein the form-birefringent layer is incorporated into an anti-reflection thin film stack.

7. An optical retarder according to claim 1, wherein the predetermined A-plate retardance is between 1 and 30 nm at a wavelength in the visible band.

8. An optical retarder according to claim 1, wherein the optical retarder is a trim retarder, and wherein the predetermined A-plate retardance is for compensating for the residual in-plane birefringence of a liquid crystal display panel.

9. An optical retarder according to claim 8, comprising a form-birefringent anti-reflection stack including a first plurality of dielectric layers having first refractive index, interleaved with at least a second plurality of dielectric layers having a second refractive index, for providing –C-plate retardance for compensating the out-of-plane birefringence of the liquid crystal display panel.

10. An optical retarder according to claim 9, wherein the form-birefringent layer and the form-birefringent anti-reflection stack are coupled to opposite sides of a substrate.

11. An optical retarder according to claim 9, wherein the form-birefringent layer and the form-birefringent anti-reflection stack are cascaded on a same side of a substrate.

12. An optical retarder according to claim 9, wherein the form-birefringent layer and the form birefringent anti-reflection stack are coupled to a cover plate of the liquid crystal display panel.

13. A method of fabricating an optical retarder comprising: depositing a form-birefringent layer on a surface using an oblique angle deposition, wherein the form-birefringent layer has a predetermined A-plate retardance, wherein the form-birefringent layer is substantially non-porous, wherein the form-birefringent layer is substantially amorphous, and wherein the form-birefringent layer lacks distinct column/void microstructure.

14. A method of fabricating an optical retarder according to claim 13, wherein depositing the form-birefringent layer using the oblique angle deposition includes directing a material towards the surface at the deposition angle using an energetic process.

15. A method of fabricating an optical retarder according to claim 13, wherein the energetic process includes an ion-assisted deposition.

16. A method of fabricating an optical retarder according to claim 13, wherein depositing the form-birefringent layer using the oblique angle deposition includes directing a material towards the surface using a range of incident vapour flux angles.

17. A method of fabricating an optical retarder according to claim 16, wherein the average deposition angle is less than about 40°.

18. A method of fabricating an optical retarder according to claim 16, wherein the maximum deposition angle is less than about 40°.

19. A method of fabricating an optical retarder according to claim 16, including using a mask to reduce the maximum deposition angle.

20. A method of fabricating an optical retarder according to claim 13, wherein the optical retarder is a trim retarder, and wherein depositing the form-birefringent layer using the oblique angle deposition includes directing a material towards the surface at a deposition angle less than 40° until the form-birefringent layer is sufficiently thick to have the predetermined A-plate retardance, the predetermined A-plate retardance for compensating for the residual in-plane birefringence of a liquid crystal display panel.

21. A liquid crystal display based projection system comprising: a light source; a first polarizer for receiving light from the light source and transmitting a first linearly polarized light having a first linear polarization axis; a liquid crystal display panel for optically modulating the first linearly polarized light, the liquid crystal display panel having residual birefringence; a second polarizer for receiving the optically modulated light and for transmitting a second linearly polarized light having a second linear polarization axis; a projection lens for projecting the second linearly polarized light onto a screen; and a trim retarder for compensating the residual birefringence of the liquid crystal display panel, the trim retarder comprising: a form-birefringent layer deposited using an oblique angle deposition, wherein the form-birefringent layer has a predetermined A-plate retardance, wherein the form-birefringent layer is substantially non-porous, wherein the form-birefringent layer is substantially amorphous, and wherein the form-birefringent layer lacks distinct column/void microstructure.

22. A liquid crystal display based projection system according to claim 21, wherein the trim retarder has an out-of-plane retardance of between 0 nm and –1000 nm in a wavelength range between 380 nm and 800 nm, and an in-plane retardance of between 1 nm and 30 nm in a wavelength range between 380 nm to 800 nm.

23. The liquid crystal display based projection system according to claim 21, wherein the trim retarder is integrated with the liquid crystal display panel.

24. The liquid crystal display based projection system according to claim 21, wherein the liquid crystal display panel is a VAN-mode LCoS microdisplay panel, and wherein the first and second polarizers are a same polarization beam splitter.

25. A method of providing polarization control comprising: inserting an optical retarder in a polarized beam of light, the optical retarder including a form-birefringent layer deposited using an oblique angle deposition, wherein the form-birefringent layer has a predetermined A-plate retardance, wherein the form-birefringent layer is substantially non-porous, wherein the form-birefringent layer is substantially amorphous, and wherein the form-birefringent layer lacks distinct column/void microstructure.

26. A method according to claim 25, wherein inserting the optical retarder in a polarized beam of light comprises inserting the optical retarder in a polarized beam of light in a liquid crystal display based projection system, and wherein the predetermined A-plate retardance is for compensating for the residual in-plane birefringence of a liquid crystal display panel in the projection system.

27. A method according to claim 26, wherein the optical retarder is an all-dielectric trim retarder.

28. A method according to claim 26, wherein the predetermined A-plate retardance is sufficiently high to provide the polarization control.

29. A method according to claim 27, comprising rotating the trim retarder about an axis substantially perpendicular to the plane thereof such that the system contrast level is increased.

* * * * *